United States Patent
Yokoyama et al.

(10) Patent No.: US 10,530,766 B2
(45) Date of Patent: Jan. 7, 2020

(54) WIRELESS COMMUNICATION APPARATUS, WIRELESS COMMUNICATION SYSTEM, WIRELESS COMMUNICATION METHOD, AND COMPUTER-READABLE RECORDING MEDIUM

(71) Applicant: SEIKO EPSON CORPORATION, Tokyo (JP)

(72) Inventors: Daiki Yokoyama, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 15/206,776

(22) Filed: Jul. 11, 2016

(65) Prior Publication Data

US 2017/0041977 A1 Feb. 9, 2017

(30) Foreign Application Priority Data

Aug. 7, 2015 (JP) ................. 2015-156783

(51) Int. Cl.
*H04L 29/06* (2006.01)
*H04W 12/00* (2009.01)
(Continued)

(52) U.S. Cl.
CPC ............ *H04L 63/083* (2013.01); *H04L 63/10* (2013.01); *H04N 1/327* (2013.01);
(Continued)

(58) Field of Classification Search
CPC ... H04W 76/027; H04W 76/18; H04W 12/06; H04W 12/08; H04W 48/16; H04W 48/20;
(Continued)

(56) References Cited

U.S. PATENT DOCUMENTS 9,686,404 B1 * 6/2017 Pan .................. H04M 3/42391
2006/0282885 A1 * 12/2006 Combs .................. H04W 28/18
726/5

(Continued)

FOREIGN PATENT DOCUMENTS

JP 2010-081566 A 4/2010
JP 2011-035760 A 2/2011
(Continued)

*Primary Examiner* — Oleg Korsak
(74) *Attorney, Agent, or Firm* — Global IP Counselors, LLP

(57) ABSTRACT

A wireless communication apparatus includes a first connection processing unit that performs a wireless connection process for performing a wireless connection to an access point (an example of a relay apparatus), and a temporary connection processing unit that in a case where the first connection processing unit fails in the wireless connection process, searches for (for example, SSID scan) a wireless setting-completed apparatus in which connection setting information for a connection to the relay apparatus is already set, and performs a temporary connection to the wireless setting-completed apparatus which is found from the searching. Further, the wireless communication apparatus includes a second connection processing unit that acquires connection setting information from the wireless setting-completed apparatus through the temporary connection, and performs a wireless connection to the access point based on the connection setting information.

12 Claims, 9 Drawing Sheets

(51) Int. Cl.
*H04W 76/19* (2018.01)
*H04N 1/327* (2006.01)
*H04W 12/06* (2009.01)
*H04W 12/08* (2009.01)
*H04W 48/16* (2009.01)
*H04W 48/20* (2009.01)
*H04W 88/04* (2009.01)
*H04W 88/14* (2009.01)
*H04W 88/08* (2009.01)

(52) U.S. Cl.
CPC ..... *H04W 12/003* (2019.01); *H04W 12/0023* (2019.01); *H04W 12/06* (2013.01); *H04W 12/08* (2013.01); *H04W 48/16* (2013.01); *H04W 48/20* (2013.01); *H04W 76/19* (2018.02); *H04W 88/04* (2013.01); *H04W 88/08* (2013.01); *H04W 88/14* (2013.01)

(58) Field of Classification Search
CPC ...... H04W 12/04; H04L 63/083; H04L 63/10; H04N 1/327
See application file for complete search history.

(56) References Cited

U.S. PATENT DOCUMENTS

| | | | |
|---|---|---|---|
| 2011/0188658 A1 | 8/2011 | Sakai et al. | |
| 2013/0036231 A1* | 2/2013 | Suumaki | H04W 12/04 709/228 |
| 2014/0118778 A1* | 5/2014 | Lee | H04N 1/00127 358/1.15 |
| 2014/0320886 A1 | 10/2014 | Uchikawa | |

FOREIGN PATENT DOCUMENTS

| | | |
|---|---|---|
| JP | 2012-109790 A | 6/2012 |
| JP | 2014-216913 A | 11/2014 |

\* cited by examiner

WIRELESS COMMUNICATION APPARATUS, WIRELESS COMMUNICATION SYSTEM, WIRELESS COMMUNICATION METHOD, AND COMPUTER-READABLE RECORDING MEDIUM

CROSS REFERENCES TO RELATED APPLICATIONS

This application claims priority to Japanese Application No. 2015-156783, filed Aug. 7, 2015, the entirety of which is incorporated by reference herein.

BACKGROUND

1. Technical Field

The present invention relates to a wireless communication apparatus, a wireless communication system, a wireless communication method, and a computer-readable recording medium, which set connection setting information required for a connection to a relay apparatus such as an access point.

2. Related Art

In the related art, various methods have been proposed which simplify a user's setting work for establishing a wireless communication connection between apparatuses having wireless connection functions. For example, JP-A-2011-35760 (for example, FIG. 4, FIG. 5, and the like) discloses a network apparatus that receives a signal indicating which method is available among a plurality of wireless connection setting methods, from an access point, and performs setting of a connection to the access point by using the connection setting method which is selected in response to the received signal. The network apparatus employs a push button type connection setting method capable of setting a communication connection to an access point if a predetermined button is pressed down, and a wizard type connection setting method which presents a connection setting procedure to a user through a dialogue prompts for each step, using a user interface.

Even if a user performs a wireless connection according to a wireless LAN simple connection setting method with either the push button type connection setting method or the wizard type connection setting method, it is determined whether the wireless connection according to the wireless LAN simple connection setting method is successful in response to the completion of the wireless connection. If the connection is determined to be successful, specific information indicating that the wireless connection is made using the wireless LAN simple connection setting method is stored in a storage unit. In contrast, if the connection is determined not to be successful, a message indicating that the connection fails is displayed.

However, in an environment in which there is a wireless setting-completed apparatus in which connection setting information of a relay apparatus such as an access point is already set, in a case where a wireless connection between a wireless communication apparatus for which wireless setting is not completed and the wireless setting-completed apparatus is performed through the relay apparatus, it is necessary to input and set the connection setting information about the relay apparatus, in the wireless communication apparatus. At this time, the user inputs, for example, network identification information such as an SSID and a password. However, in a case where at least one of the network identification information and the password is incorrect due to an input operation error made by the user, the wireless connection to the relay apparatus fails. However, in the network apparatus described in JP-A-2011-35760, in a case where a wireless connection to the relay apparatus such as an access point fails, there is no remedy. Therefore, in a case where the wireless connection to the relay apparatus fails due to some cause such as an input operation of incorrect connection setting information, if the user does not know the cause of the wireless connection failure of the wireless communication apparatus to the relay apparatus, this finally causes a problem that the wireless communication apparatus can no longer be connected to the relay apparatus.

SUMMARY

An advantage of some aspects of the invention is to provide a wireless communication apparatus, a wireless communication method, and a computer-readable recording medium, each of which is capable of relatively smoothly performing a wireless connection to a desired relay apparatus, even after the wireless communication apparatus fails in the wireless connection to the relay apparatus.

Hereinafter, means of the invention and operation effects thereof will be described.

According to an aspect of the invention, there is provided a wireless communication apparatus including a first connection processing unit that performs a wireless connection process for performing a wireless connection to a relay apparatus; a temporary connection processing unit that in a case where the first connection processing unit fails in the wireless connection process, searches for a wireless setting-completed apparatus in which connection setting information for a connection to the relay apparatus is already set, and performs a temporary connection to the wireless setting-completed apparatus which is found from the searching; and a second connection processing unit that acquires the connection setting information from the wireless setting-completed apparatus through the temporary connection, and performs a wireless connection to the relay apparatus based on the connection setting information.

In this configuration, the first connection processing unit performs the wireless connection process for a wireless connection to the relay apparatus. In a case where the first connection processing unit fails in the wireless connection process, the temporary connection processing unit searches for a wireless setting-completed apparatus in which connection setting information for a connection to the relay apparatus is already set, and performs a temporary connection to the wireless setting-completed apparatus which is found from the searching. The second connection processing unit acquires connection setting information from the wireless setting-completed apparatus through the temporary connection, and performs a wireless connection to the relay apparatus based on the connection setting information. Thus, even if the first connection processing unit fails in the wireless connection process, the temporary connection to the wireless setting-completed apparatus is performed and thus connection setting information can be achieved from the wireless setting-completed apparatus, such that the second connection processing unit can perform a wireless connection to the wireless setting-completed apparatus. Therefore, it is possible to avoid a situation where the wireless connection to the relay apparatus is not possible.

In the wireless communication apparatus, it is preferable that the first connection processing unit compares connection setting information that is input with the connection setting information of the wireless setting-completed apparatus, and outputs a comparison result to an output unit so as to notify a user of the comparison result.

In this configuration, the first connection processing unit compares the connection setting information that is input with connection setting information of the wireless setting-completed apparatus, and outputs a comparison result to the output unit so as to notify a user of the comparison result. The user can check correct connection setting information to be input, from the comparison result. Therefore, if the user performs an operation of re-inputting or selecting the correct connection setting information from a list, or checking a candidate for the connection setting information that is output, it is possible to relatively quickly connect the wireless communication apparatus to the relay apparatus in a wireless manner.

In the wireless communication apparatus, it is preferable that the output unit outputs the comparison result, and the second connection processing unit receives a check input in which a user checks correct connection setting information based on the comparison result, and performs a wireless connection to the relay apparatus based on the connection setting information which is received by the check input.

In this configuration, the user who views the comparison result that is output to the output unit checks correct connection setting information, and performs a check input operation that permits wireless connection based on the correct connection setting information. The second connection processing unit performs a wireless connection to the relay apparatus based on the correct connection setting information which is received by the check input. Thus, even if the first connection processing unit fails in the wireless connection process with the relay apparatus because of wrong connection setting information due to the input error of the user, the wireless communication apparatus is able to be wirelessly connected to the relay apparatus.

It is preferable that in the wireless communication apparatus, the first connection processing unit compares at least network identification information pieces of the connection setting information, and outputs a comparison result to the output unit, and the second connection processing unit receives a check input in which a user checks correct network identification information, and performs a wireless connection to the relay apparatus based on the network identification information which is received by the check input.

In this configuration, since the first connection processing unit compares at least network identification information pieces of the connection setting information that is input, with at least network identification information pieces of the connection setting information of the wireless setting-completed apparatus, and outputs the comparison result to the output unit, the user who views the comparison result checks correct connection setting information, and performs a check input operation that permits wireless connection based on the correct connection setting information. The second connection processing unit performs a wireless connection to the relay apparatus based on the correct connection setting information which is received by the check input. Thus, even if the first connection processing unit fails in the wireless connection process with the relay apparatus because of wrong connection setting information due to the input error of the user, the wireless communication apparatus is able to be wirelessly connected to the relay apparatus.

It is preferable that the wireless communication apparatus further includes a storage unit that stores connection setting information pieces by which the first connection processing unit and the second connection processing unit can perform a connection, as connection history, and the first connection processing unit outputs a difference between correct connection setting information of the connection history and connection setting information which is input by an operation unit, as the comparison result, to the output unit.

In this configuration, since a difference between the correct connection setting information which is stored as connection history and the connection setting information that is input by the user is output to the output unit by the first connection processing unit, the user immediately knows which is incorrect from the difference and easily recognizes correct connection setting information.

In the wireless communication apparatus, it is preferable that the connection setting information includes network identification information and a password, the wireless communication apparatus further includes a checking unit that in a case where the network identification information pieces do not match and the passwords match, from the comparison result, displays the network identification information corresponding to the password, and displays a message for checking whether or not the network identification information indicates a connection destination, on a display unit, and upon receipt of a check input indicating the connection destination, the second connection processing unit performs a wireless connection to the relay apparatus based on the network identification information.

In this configuration, in a case where the network identification information does not match and the password matches, from the comparison result, network identification information corresponding to the password is displayed on a display unit, and a message for checking whether the network identification information indicates a connection destination is displayed on the display unit. Upon receipt of a check input indicating the connection destination, the second connection processing unit performs a wireless connection to the relay apparatus based on the network identification information.

In the wireless communication apparatus, it is preferable that the first connection processing unit performs a wireless connection to the relay apparatus with a push button type connection setting method capable of performing connection setting of a communication with the relay apparatus if a predetermined button is pressed down, and in a case where the wireless connection to the relay apparatus with the push button type connection setting method fails, the temporary connection processing unit performs a temporary connection to the wireless setting-completed apparatus, and the second connection processing unit performs a wireless connection to the relay apparatus, based on the connection setting information acquired from the wireless setting-completed apparatus through the temporary connection.

In this configuration, in a case where the wireless connection to the relay apparatus fails which is performed by the first connection processing unit with the push button type connection setting method in which a predetermined button is pressed, the wireless communication apparatus is temporarily connected to the wireless setting-completed apparatus by the temporary connection processing unit. The second connection processing unit performs a wireless connection to the relay apparatus, based on connection setting information acquired from the wireless setting-completed apparatus through the temporary connection. Thus, even if the wireless connection to the relay apparatus with the push button type connection setting method fails, it is possible to wirelessly connect the wireless communication apparatus to the relay apparatus.

According to another aspect of the invention, there is provided a wireless communication system that includes a wireless setting-completed apparatus in which connection setting information required for a connection to a relay apparatus is already set, and a wireless communication apparatus, in which the wireless communication apparatus performs a connection process for a connection to the relay apparatus based on first connection setting information which is input, acquires the first connection setting information and one or more pieces of second connection setting information that the wireless setting-completed apparatus stores as connection history, in a case where the connection to the relay apparatus fails in the connection process, and includes an analysis unit that compares the first connection setting information with the second connection setting information, the analysis unit is provided in at least one of the wireless communication apparatus and the wireless setting-completed apparatus, and a comparison result obtained by the analysis unit comparing the first connection setting information with the second connection setting information is displayed on a display unit of the wireless setting-completed apparatus, or a display unit of the wireless communication apparatus.

In this configuration, in a case where a connection process for a connection to a relay apparatus based on first connection setting information which is input fails, the first connection setting information and one or more pieces of second connection setting information that the wireless setting-completed apparatus stores as connection history are acquired. The analysis unit compares the first connection setting information with the second connection setting information. A comparison result obtained from the analysis unit is displayed on a display unit of the wireless setting-completed apparatus, or a display unit of the wireless communication apparatus. Thus, it becomes easier for the user to know relatively quickly the correct connection setting information, by checking the comparison result displayed on the display unit.

According to a still another aspect of the invention, there is provided a wireless communication method including performing a wireless connection process for performing a wireless connection to a relay apparatus; searching for a wireless setting-completed apparatus in which connection setting information for a connection to the relay apparatus is already set, in a case where the wireless connection process fails in the performing of the wireless connection process, and performing a temporary connection to the wireless setting-completed apparatus which is found from the searching; and acquiring connection setting information from the wireless setting-completed apparatus through the temporary connection, and performing a wireless connection to the relay apparatus based on the connection setting information. According to this method, it is possible to achieve the same effect as in the wireless communication apparatus.

According to a still further another aspect of the invention, there is provided a computer-readable recording medium storing a program causing a computer of a wireless communication apparatus to: perform a wireless connection process for performing a wireless connection to a relay apparatus; search for a wireless setting-completed apparatus in which connection setting information for a connection to the relay apparatus is already set, in a case where the wireless connection process fails in the performing of the wireless connection process, and perform a temporary connection to the wireless setting-completed apparatus which is found from the searching; and acquire connection setting information from the wireless setting-completed apparatus through the temporary connection, and perform a wireless connection to the relay apparatus based on the connection setting information. It is possible to achieve the same effect as in the wireless communication apparatus, by the computer executing the program.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of a wireless communication system will be described with reference to the drawings.

Figure 1:
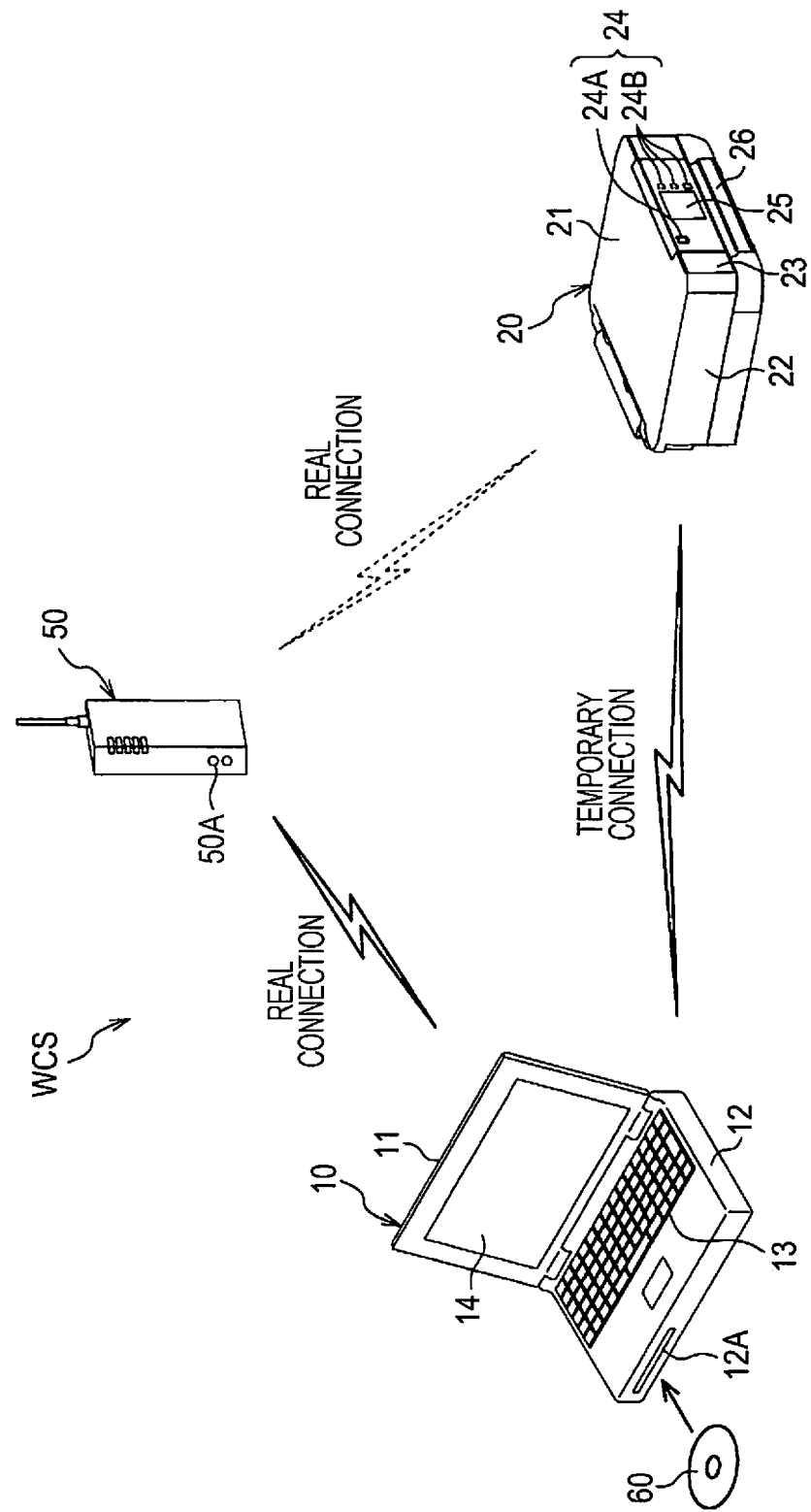
FIG. 1 is a schematic diagram illustrating a wireless communication system according to a first embodiment.

As illustrated in FIG. 1, a wireless communication system WCS includes a wireless setting-completed apparatus 10, a wireless communication apparatus 20, and an access point 50 which is an example of a relay apparatus. In the example of FIG. 1, the wireless setting-completed apparatus 10 is, for example, a guide device 11 which is a personal computer (hereinafter, also referred to as "PC"), and the wireless communication apparatus 20 is, for example, a printing device 21. The access point 50 is, for example, a wireless router having an access point function. In the example of FIG. 1, the wireless setting-completed apparatus 10 and the wireless communication apparatus 20 are disposed in the area (wireless communication possible area) of the wireless network of the access point 50. In this example, the wireless setting-completed apparatus 10, the wireless communication apparatus 20, and the access point 50 have a wireless communication function conforming to the IEEE802.11 standards. Hereinafter, it is assumed that communication conforming to IEEE802.11 is referred to as wireless LAN communication. In addition, without being limited to a laptop PC that is illustrated in FIG. 1 as an example, the guide device 11 which is an example of the wireless setting-completed apparatus 10 may be a desktop PC, a tablet PC or the like, or may be a smart device such as a portable information terminal (personal digital assistants: PDA) or a smart phone, which is able to perform wireless LAN communication with the wireless communication apparatus 20, in addition to the PC.

The wireless setting-completed apparatus 10 is wirelessly connected to the access point 50 to participate in a wireless LAN of the access point 50, which enables a wireless connection to other wireless apparatuses (not illustrated) including the wireless communication apparatus 20 through the access point 50. Connection setting information required for a wireless connection to the access point 50 is already set in the wireless setting-completed apparatus 10. In addition, it is necessary for the user to input and set the connection setting information such that the wireless communication apparatus 20 participates in the wireless LAN of the access point 50. An example of a timing at which the user inputs and sets the connection setting information includes a timing of inputting and setting the connection setting information required for the wireless communication apparatus 20 to first perform a wireless connection, a timing of changing the access point 50 to be connected from another access point, and the like. In these cases, the user inputs and sets the connection setting information to the wireless communication apparatus 20. Note that a push button 50A for simple setting is provided in the access point 50 illustrated in FIG. 1.

As illustrated in FIG. 1, the wireless setting-completed apparatus 10 (guide device 11) includes a main body 12, an operation unit 13, and a display unit 14 which is an example of an output unit. The main body 12 is provided with an insertion opening 12A (see FIG. 1) in which a setup disk 60 such as a CD or a DVD is settable. The setup disk 60 stores various programs required for setup of the wireless communication apparatus 20. Various programs stored in the setup disk 60 which is set in the insertion opening 12A are read by a reading device, not illustrated, in the wireless setting-completed apparatus 10, and are installed in the wireless setting-completed apparatus 10. The various programs include a wireless setting guide program for guiding the setting of the connection setting information required in order to enable wireless communication to the wireless communication apparatus 20 through the access point 50, in addition to a driver program for driving the wireless communication apparatus 20. The wireless setting guide program has a setting guide function for guiding an input setting operation of the connection setting information of the user, when changing the connection destination, in addition to the setup function of guide when first setting the connection setting information.

As illustrated in FIG. 1, the printing device 21, which is an example of the wireless communication apparatus 20, includes a main body 22 having a substantially rectangular parallelepiped shape, and an operation panel 23 which is placed on the front surface (the right-hand front face in FIG. 1) of the main body 22. The operation panel 23 is provided with an operation unit 24, and a display unit 25 which is an example of an output unit. The operation unit 24 includes a power button 24A (power switch), and an operation button 24B that is an example of an operation unit which is used to select a desired item from a menu that is displayed on the display unit 25, or to input or select various pieces of information when performing a wireless setting operation. The user performs an operation required for setting such as the input of the value (for example, a code) of the connection setting information at the time of the initial setting or re-setting by operating the operation button 24B.

As illustrated in FIG. 1, a cassette 26 capable of accommodating a medium such as a plurality of sheets is inserted in a removable state, in the lower portion of the main body 22 of the printing device 21 which is an example of the wireless communication apparatus 20. For example, upon receipt of print data from the wireless setting-completed apparatus 10 (for example, the guide device 11) through wireless LAN communication, the printing device 21 feeds the media in the cassette 26 to a printing unit (not illustrated) in the main body 22 one by one, and the printing unit prints a document or an image based on the print data on the fed media. The printing device 21 is connected to the guide device 11 through a communication cable (not illustrated) so as to enable wired communication, and is able to perform printing based on the print data which is received from the guide device 11 in a wired manner. Further, it is possible to use the printing device 21 as a stand-alone type, in which, for example, a portable storage medium such as a memory card or a USB memory is inserted into the insertion opening of the main body 22 by operating the operation unit 24, and images based on the image data which is read from the portable storage medium by a reading device, not illustrated, are printed on the media.

Figure 2:
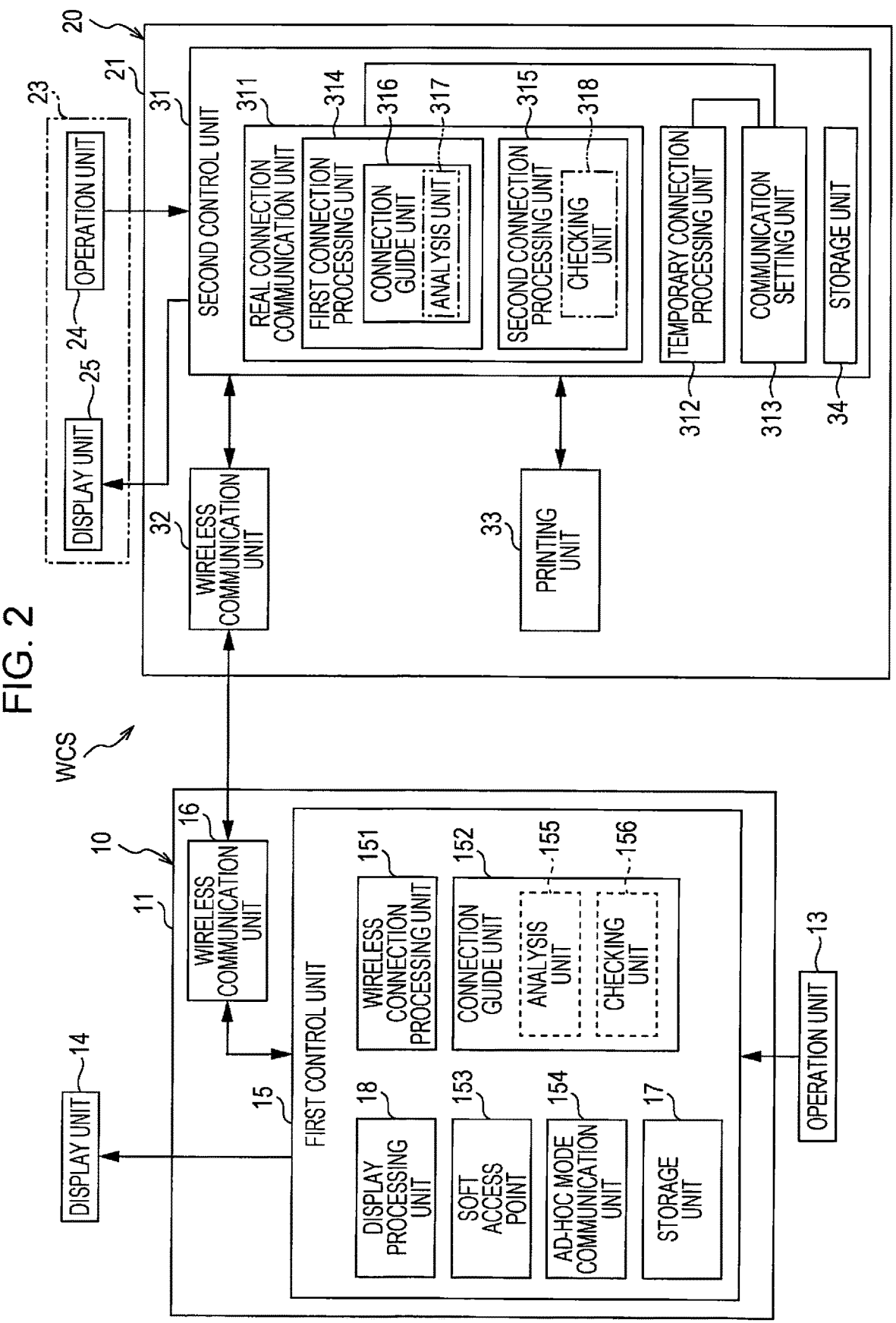
FIG. 2 is a block diagram illustrating electrical configurations and functional configurations of a wireless setting-completed apparatus and a wireless communication apparatus, which are included in the wireless communication system.

As illustrated in FIG. 2, the wireless setting-completed apparatus 10 includes a first control unit 15 and a wireless communication unit 16. The wireless communication unit 16 includes an electronic circuit for wireless LAN communication conforming to IEEE802.11. The first control unit 15 includes a CPU which is not illustrated, a storage unit 17, an input and output circuit which is not illustrated, a display processing unit 18, and the like. The storage unit 17 includes a main memory which is not illustrated, a ROM, and the like. The first control unit 15 performs various controls including the control of the wireless communication unit 16 and the control of the display unit 14, and various processes including a wireless setting guide process, by the CPU executing various programs stored in the storage unit 17. The first control unit 15 performs display control of the display unit 14 by the display processing unit 18.

The program includes a program for wireless connection, and a wireless setting guide program, in addition to an operating system (OS). The wireless setting guide program is activated when the user inserts the setup disk 60 into the insertion opening 12A (see FIG. 1) of the main body 12, or when the user selects an item of "wireless setting" in an electronic manual (data including a program start-up link). The CPU which is the first control unit 15 executes the wireless setting guide program, with these operations as a trigger.

As illustrated in FIG. 2, in the present example, the first control unit 15 functions as a wireless connection processing unit 151, a connection guide unit 152, a soft access point 153 (hereinafter, also referred to as a "soft AP 153"), and an ad-hoc mode communication unit 154, by the computer which is the first control unit 15 executing a program. Here, the first control unit 15 functions as the connection guide unit 152, by the computer executing the wireless setting guide program.

A service set identifier (SSID) is already set as an example of network identification information required to participate in the wireless network of the access point 50, in the wireless setting-completed apparatus 10. Connection setting information including the SSID and a password (encryption key) required for the wireless connection to the access point 50 is stored in the storage unit 17.

As illustrated in FIG. 2, the wireless connection processing unit 151 has a function of scanning (searching) the SSID through the wireless communication unit 16. At first, the wireless connection processing unit 151 makes an inquiry to the OS, and acquires connection setting information including the SSID (SSID for main connection) and a password of the access point 50 which is already set. The wireless connection processing unit 151 scans the SSID which is already set in the setting-completed access point 50. If the SSID is found, the wireless connection processing unit 151 performs a wireless connection to the access point 50 based on the found SSID, and participates in the wireless LAN of the access point 50. In this manner, the wireless connection processing unit 151 has a function of performing a main connection to the access point 50. Note that the main connection includes wireless connection to the wireless communication apparatus 20 through the access point 50 in an infrastructure mode, and wireless connection to the wireless communication apparatus 20 without passing through the access point 50 in peer-to-peer (P2P) communication.

In a case where the connection guide unit 152 illustrated in FIG. 2 guides the wireless setting of the wireless communication apparatus 20, the soft AP 153 or the ad-hoc mode communication unit 154 broadcasts an SSID for a temporary connection. If the wireless communication apparatus 20 finds the SSID for a temporary connection, the wireless setting-completed apparatus 10 is temporarily connected to the wireless communication apparatus 20. A value, which is included in advance in a wireless setting guide program, is used as the SSID for a temporary connection to be broadcast. In this case, device identification information (for example, a MAC address) capable of identifying the wireless communication apparatus 20 is acquired and stored in the storage unit 17. In addition, for example, the SSID for a temporary connection is set in advance as network identification information which is common to various models, in the printing device 21 which is an example of the wireless communication apparatus 20 of the present example.

At the time of a wireless setting guide operation, the connection guide unit 152 transmits the connection setting information including the SSID and the password of the access point 50 which is already set in the wireless setting-completed apparatus 10, through a wireless temporary connection to the wireless communication apparatus 20 that the soft AP 153 or the ad-hoc mode communication unit 154 has established, to the wireless communication apparatus 20, in a way that responds to the request of the wireless communication apparatus 20.

For example, when the user inputs the connection setting information to the wireless communication apparatus 20 and attempts a connection to the access point 50, in a case where the connection fails, the connection guide unit 152 provides guidance for performing wireless setting smoothly. In this case, the connection guide unit 152 displays a message indicating whether to use the connection setting information that is already set in the wireless setting-completed apparatus 10. Upon receipt of an input indicating that the user desires to use the connection setting information by operating the operation unit 13, the connection guide unit 152 transmits the connection setting information that is already set, to the wireless communication apparatus 20 so as to set the connection setting information that is already set in the wireless setting-completed apparatus 10, in the wireless communication apparatus 20.

The soft AP 153 illustrated in FIG. 2 causes the wireless setting-completed apparatus 10 to function as a virtual wireless access point. The wireless setting-completed apparatus 10 activates the soft AP 153 to function as the access point.

The ad-hoc mode communication unit 154 has a function of performing wireless connection in a peer-to-peer (P2P) in an ad hoc mode. In a case where the ad-hoc mode communication unit 154 is activated, the SSID for a temporary connection and the attribute are broadcast by the wireless communication unit 32. The attribute is information to distinguish between a master device and a slave device in wireless LAN communication in the ad-hoc mode. Wi-Fi Direct (registered trademark) may be provided as another wireless communication unit for a temporary connection.

As illustrated in FIG. 2, the connection guide unit 152 includes an analysis unit 155 and a checking unit 156. In a case where the wireless communication apparatus 20 fails in the main connection to the access point 50, the connection setting information that is input by the user and the information on the failure cause are received from the wireless communication apparatus 20, and why the wireless communication apparatus 20 fails in the main connection is analyzed based on the connection setting information. Here, the wireless connection processing unit 151 stores the connection setting information of the access point 50 that was connected in the past in the storage unit 17 as history information. The analysis unit 155 compares the connection setting information that is input by the user with the connection setting information that is already set and the connection setting information as the history information, which are stored in the storage unit 17, searches for connection setting information having the highest similarity, and extracts a difference between the connection setting information having the highest similarity and the connection setting information to be analyzed.

The analysis unit 155 compares the SSID and the password that are included in the connection setting information which is input by the user, with the SSID and the password that are included in the connection setting information which is stored as the history information indicating the current connection and the past connection, respectively. The comparison result generated by the analysis unit 155 includes, for example, a case where the input password matches the stored password but the SSIDs do not match, a case where the input SSID matches the stored SSID but the passwords do not match, a case where the input SSID and password do not match the stored SSID and password, and the like.

The checking unit 156 in the connection guide unit 152 displays the guide screens 71 to 73 (for example, FIG. 3 to FIG. 5) based on the analysis result of the analysis unit 155 obtained by comparing the connection setting information that is input by the user with the correct connection setting information which is already set in the wireless setting-completed apparatus 10, on the display unit 14, and receives checking as to correct connection setting information from the user. It should be noted that the guidance of the analysis result (comparison result) is not limited to the display guidance, and may be voice guidance. In this manner, the output unit may be a display unit that outputs an image such as a guide screen, or may be a speaker that outputs voice guidance.

As illustrated in FIG. 2, for example, the wireless communication apparatus 20 which is the printing device 21 includes a second control unit 31, a wireless communication unit 32, and a printing unit 33. The printing unit 33 prints a document or an image based on print data on a medium such as a sheet and a synthetic resin sheet, by a known printing method such as an electrophotographic method or an inkjet method. The printing unit 33 includes a transport mechanism that transports media to be printed, a transportation motor which is a power source thereof, and a print head to print ink on the media. The printing device 21 may be a serial printer in which a print head prints one line at a time while moving back and forth in the scanning direction, or may be a line printer including an elongated printing head of a length capable of printing one line at a time.

The wireless communication unit 32 includes an electronic circuit for wireless LAN communication conforming to IEEE802.11. The second control unit 31 is made of a computer which is configured by an integrated circuit (IC chip) or the like on a substrate mounted in the main body 22, and includes a CPU which is not illustrated, a storage unit 34, an input and output circuit which is not illustrated, and the like. The storage unit 34 includes, for example, a main memory made of a RAM or the like, and a nonvolatile memory. The storage unit 34 stores various programs including a wireless setting processing program, and a control program for controlling the operation (for example, a printing operation) of the wireless communication apparatus 20.

The second control unit 31 illustrated in FIG. 2 controls the display unit 25, the wireless communication unit 32, the printing unit 33, and the like, by the control program which is stored in a non-volatile memory being loaded into the main memory, and being executed by the CPU. In addition, the CPU which is the second control unit 31 executes the wireless setting processing program to cause the second control unit 31 to function as a main connection communication unit 311, a temporary connection processing unit 312, and a communication setting unit 313.

When connecting the wireless communication apparatus 20 to the access point 50, the user operates the operation unit 24 to input the connection setting information. Specifically, the user operates the operation unit 24 to input the SSID and the password as an example of the network identification information, and designates the access point 50 to be connected. The main connection communication unit 311 in the second control unit 31 accepts the connection setting information that the user inputs by using the operation unit 24.

The main connection communication unit 311 includes a first connection processing unit 314 that performs a wireless connection to participate in the wireless LAN of the access point 50 based on the connection setting information that is input by the user, and a second connection processing unit 315 that performs a wireless connection to participate in the wireless LAN of the access point 50 based on the correct connection setting information that is acquired after the case where the first connection processing unit 314 fails in the wireless connection. Upon receipt of the connection setting information that is input by the user, the first connection processing unit 314 scans an SSID through the wireless communication unit 32, and searches for an SSID which is an example of network identification information among the connection setting information that is input by the user. If the SSID is found, the first connection processing unit 314 performs a wireless connection to the access point 50 based on the found SSID.

If the SSID of the access point 50 that is designated by the user is found from the result of SSID scanning through the wireless communication unit 32, the main connection communication unit 311 performs a wireless connection to the access point 50 based on the found SSID. Thus, the wireless communication apparatus 20 participates in the wireless LAN of the access point 50, which enables wireless communication with the wireless setting-completed apparatus 10 in the infrastructure mode. Further, in a case where the SSID that is designated by the user cannot be found within a search area of the wireless communication unit 32, the main connection communication unit 311 fails in the wireless connection process based on the connection setting information. Even if the SSID that is designated by the user can be found within the search area of the wireless communication unit 32, in a case where passwords required to establish wireless connection are different, the main connection communication unit 311 fails in the wireless connection process based on the connection setting information.

Here, in a case where the wireless connection to the access point 50 fails due to an input error such as one in which the user incorrectly inputs at least one of the SSID and the password, included in the connection setting information, to the wireless communication apparatus 20, the wireless setting guide process of informing of the failed wireless connection to success is performed, and the guide screen (FIG. 3 to FIG. 5) is displayed on at least one of the display units 14 and 25.

In a case where connection to the access point 50 is based on the SSID and the password that are input by the user, the temporary connection processing unit 312 establishes a temporary connection between the wireless communication apparatus 20 and the wireless setting-completed apparatus 10. Specifically, when the setup disk 60 is set, or when an operation of selecting "wireless connection" in the electronic manual is performed, the wireless connection processing unit 151 of the wireless setting-completed apparatus 10 once disconnects the wireless connection which is established up to that time, and broadcasts the SSID for a temporary connection. If the SSID for a temporary connection is found through scanning, the temporary connection processing unit 312 establishes a temporary connection to the wireless setting-completed apparatus 10 based on the SSID for the temporary connection.

The first connection processing unit 314 includes a connection guide unit 316 that transmits the failure cause and the connection setting information that is input by the user to the wireless setting-completed apparatus 10, in a case where the wireless connection to the access point 50 fails. The failure cause includes a fact that an SSID is not found, passwords do not match, and the like.

At this time, the wireless setting-completed apparatus 10 compares the connection setting information which is already set therein (an example of the first connection setting information) and another connection setting information that is stored in the storage unit 17 as the history information (an example of the second connection setting information), with the connection setting information that is received from the first connection processing unit 314, by using the analysis unit 155. In other words, upon receipt of the connection setting information and a request for analysis thereof, from the wireless communication apparatus 20 through the temporary connection, the wireless setting-completed apparatus 10 transmits a comparison result obtained by comparing all pieces of known connection setting information that are used at a current connection and were used at the past connection to the connection setting information that is input by the user, to the wireless communication apparatus 20, through a wireless communication path for a temporary connection.

At this time, upon receipt of a request for the connection setting information and the analysis thereof from the wireless communication apparatus 20 through the temporary connection, the wireless setting-completed apparatus 10 transmits all pieces of known connection setting information that are used at a current connection and were used at the past connection, to the wireless communication apparatus 20, through a temporary connection. Thus, the connection setting information received by the second connection processing unit 315 includes the connection setting information which is already set in the wireless setting-completed apparatus 10, and another connection setting information that is stored in the storage unit 17 as the history information.

The second connection processing unit 315 includes a checking unit 318 that notifies the user of the comparison result by displaying the guide screens 71 to 73 (FIG. 3 to FIG. 5) based on the comparison result received from the wireless setting-completed apparatus 10 on the display unit 25, and checks whether or not the connection setting information displayed on the guide screens 71 to 73 indicates a connection destination.

In addition, the connection guide unit 316 of the wireless communication apparatus 20 (for example, printing device 21) may be configured to include the analysis unit 317 having the same configuration as that of the analysis unit 155. In this case, the analysis unit 317 acquires the connection setting information that is stored in the storage unit 17 from the wireless setting-completed apparatus 10 as a comparison object, and performs analysis of comparing the acquired connection setting information and the connection setting information that the user inputs. At this time, a configuration is possible in which the comparison result obtained by the analysis is transmitted to the connection guide unit 152 of the wireless setting-completed apparatus 10 (for example, the guide device 11). In this case, the guide screens 71 to 73 are displayed on the display unit 14 on the wireless setting-completed apparatus 10 side. Further, the second connection processing unit 315 of the wireless communication apparatus 20 (for example, printing device 21) may include the checking unit 318 having the same configuration as that of the checking unit 156. In this case, the guide screens 71 to 73 are displayed on the display unit 25 on the wireless communication apparatus 20 side. In this case, the wireless communication apparatus 20 illustrated in FIG. 2 may be provided with the analysis unit 317 and the checking unit 318, which are indicated by the two-dot chain lines. The guide screens 71 to 73 (for example, FIG. 3 to FIG. 5) including the analysis result in this manner may be displayed on the display unit 14 of the wireless setting-completed apparatus 10, may be displayed on the display units 14 and 25, or may be displayed on the display unit 25 of the wireless communication apparatus 20.

In a case where wireless connection is established to a connection destination based on the connection setting information that is input by the user, the communication setting unit 313 sets the connection setting information by storing the connection setting information in the storage unit 34 (for example, non-volatile memory). Therefore, in a case where a wireless connection cannot be established based on the connection setting information that is input by the user, the connection guide units 152 and 316 perform the wireless setting guide process. Through the wireless setting guide process, the connection setting information that is input by the user is analyzed, and if the connection setting information is incorrect, the communication setting unit 313 does not set the incorrect connection setting information. Meanwhile, if the checking unit 318 receives a check input when the user who views the guide screens in FIG. 3 to FIG. 5 displayed on the display unit 25 performs an operation of ultimately checking correct connection setting information, the second connection processing unit 315 performs a process of connection to the wireless LAN of the access point 50 based on the checked connection setting information. In a case where the wireless connection is established to the access point 50 which is a connection destination based on the connection setting information, the communication setting unit 313 performs a setting process by writing the correct connection setting information into the storage unit 34.

In the present embodiment, the connection guide unit 152 on the wireless setting-completed apparatus 10 and the connection guide unit 316 on the wireless communication apparatus 20 perform the wireless setting guide process. The wireless setting guide process is performed as follows. In a case where the first connection processing unit 314 of the wireless communication apparatus 20 fails in the establishment of a wireless connection based on the connection setting information that is input by the user, the connection guide unit 316 on the wireless communication apparatus 20 side transmits the connection setting information by which the connection fails, to the connection guide unit 152 on the wireless setting-completed apparatus 10 side. The connection guide unit 152 on the wireless setting-completed apparatus 10 side compares the connection setting information by which the connection fails with the correct connection setting information that the wireless setting-completed apparatus 10 has, and analyzes the cause of failure of the wireless connection based on the connection setting information that is input by the user, by using the analysis unit 155. The connection guide unit 152 on the wireless setting-completed apparatus 10 side transmits the comparison result obtained from the analysis unit 155 to the second connection processing unit 315 on the wireless communication apparatus 20 side. In this case, the connection guide unit 152 transmits the correct connection setting information that is estimated from the comparison result (analysis result) generated by the analysis unit 155, to the wireless communication apparatus 20. The second connection processing unit 315 includes connection setting information which is already set in the wireless setting-completed apparatus 10, or connection setting information that is selected from the history information on the connection that the wireless setting-completed apparatus 10 established in the past, as an example of the correct connection setting information based on the comparison result. The second connection processing unit 315 displays the comparison result on the display unit 25 so as to notify the user of the comparison result, and informs the user of the connection setting information so as to check whether or not the connection setting information indicates a connection destination, by using the checking unit 318.

Next, an example of a guide screen that the second connection processing unit 315 displays on the display unit 25 in order to cause the user to check a connection destination will be described with reference to FIG. 3 to FIG. 5.

Figure 3:
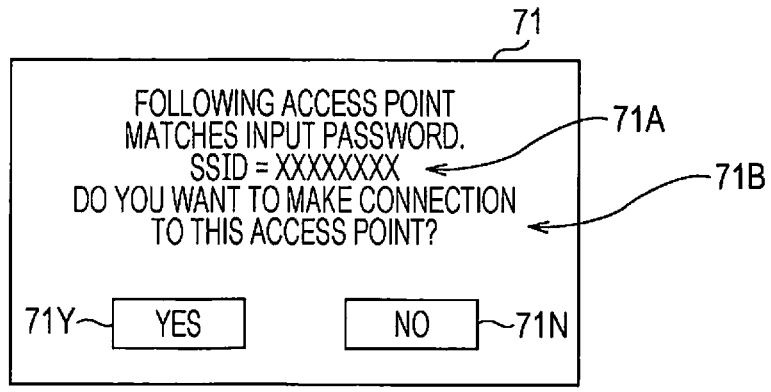
FIG. 3 is a diagram illustrating a screen indicating a comparison result and performing of a connection destination checking, displayed on the wireless setting-completed apparatus.

The guide screen 71 illustrated in FIG. 3 is displayed, for example, in a case where the analysis unit 155 analyzes that the input password matches but the SSID does not match those of the access point. As illustrated in FIG. 3, The code 71A of the SSID that matches the input password, a message 71B for checking whether to connect to the access point 50 of the code 71A of the SSID, a YES button 71Y, and a NO button 71N are displayed on the guide screen 71. If the displayed SSID is correct, the user selects the YES button 71Y by using the operation unit 24, and instructs main connection based on the connection setting information. In this case, the code of the connection setting information that is set in the wireless setting-completed apparatus 10 is likely to be displayed as the code 71A.

Further, in the present embodiment, in a case where at least the wireless communication apparatus 20 is configured to include the analysis unit 317 which is indicated by the two-dot chain line in FIG. 2, the analysis unit 317 of the first connection processing unit 314 extracts a difference between the correct connection setting information, which is stored as a connection history obtained from the wireless setting-completed apparatus 10 through the temporary connection and the connection setting information that is input by the user, by comparing one character thereof at a time. The analysis unit 317 of the present embodiment extracts a difference between network identification information (SSID) pieces and a difference between passwords, respectively. The checking unit 318 of the second connection processing unit 315 displays a guide screen (not illustrated) which is an extracted result of the analysis unit 317, and illustrating a difference between the correct connection setting information and the connection setting information that is input by the user, on the display unit 25. In addition, a configuration is possible in which the analysis unit 155 of the wireless setting-completed apparatus 10 performs the analysis in the same manner, and the checking unit 156 displays a guide screen that displays a difference between the connection setting information pieces.

Figure 4:
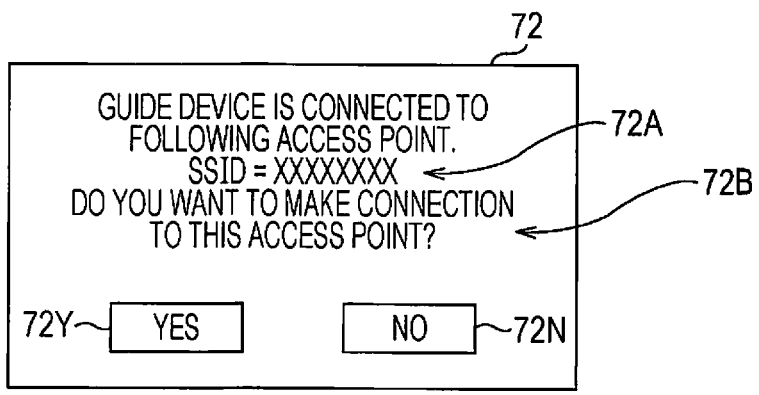
FIG. 4 is a diagram illustrating a screen indicating connection setting information and performing of a connection checking, displayed on the wireless setting-completed apparatus.

In a case where the passwords and the SSIDs respectively do not match, from the comparison result generated by the analysis unit 155, the connection setting information that is already set in the wireless setting-completed apparatus 10 (for example, the guide device 11) is displayed on a guide screen 72 illustrated in FIG. 4. For example, as illustrated in FIG. 4, a code 72A of the SSID of the access point to which the guide device 11 is connected, a message 72B for checking whether to connect to the SSID, a YES button 72Y, and a NO button 72N are displayed on the guide screen 72. If the selected SSID is satisfied as a connection destination, the user selects the YES button 72Y by using the operation unit 24.

Figure 5:
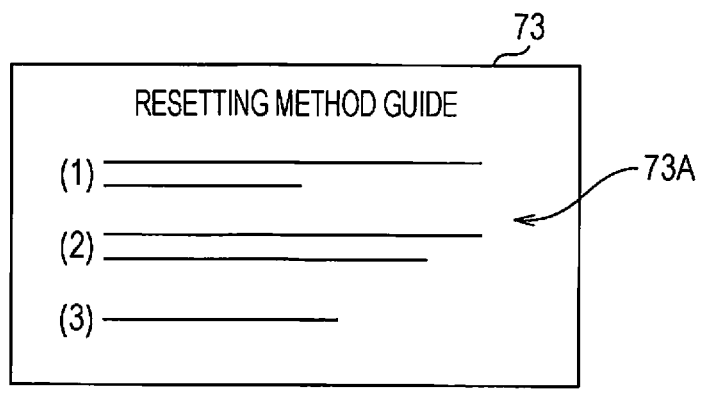
FIG. 5 is a diagram illustrating a guide screen informing a re-setting method which is displayed on the wireless setting-completed apparatus.

A guide screen 73 informing a re-setting method illustrated in FIG. 5 is displayed in a case where the passwords and the SSIDs respectively do not match, from the comparison result, and the connection setting information that the user wants is not the connection setting information that is already set in the wireless setting-completed apparatus 10 (for example, the guide device 11). A sentence 73A describing an operation method at the time of re-setting the connection setting information in the order of operations is displayed on the guide screen 73. The guide screen 73 of FIG. 5 may be displayed as a first screen that displays the comparison result, when the above conditions are satisfied, or may be displayed as the next screen, when the NO button 72N is selected on the guide screen 71 illustrated in FIG. 3 or the guide screen 72 illustrated in FIG. 4.

Further, the guide screen is not limited to the guide screens 71 to 73 which are illustrated in FIG. 3 to FIG. 5, and the connection setting information which is input and candidates for correct connection setting information are displayed so as to be compared side by side, and incorrect numbers or symbols in the code of the SSID may be indicated so as to be displayed in a different display manner such as inversion of a cursor. A configuration is possible in which the user checks correct connection setting information while checking incorrect numbers or symbols, or the user re-inputs correct connection setting information by using the operation unit 24. In addition, a list of candidates for correct connection setting information and a checking button are displayed on the guide screen, and the user operates the checking button after selecting one candidate from the list. It should be noted that a check input is an input to the second connection processing unit 315 in which the user checks a connection destination by an operation such as checking or selecting correct connection setting information in this type of guide screen.

Next, a description will be given on the operation of the wireless communication system WCS with reference to FIG. 6 to FIG. 8. Here, a case where the wireless setting-completed apparatus 10 is a guide device 11, and the wireless communication apparatus 20 is a printing device 21 will be described as an example.

The SSID and the password (encryption key) of the wireless LAN in which the access point 50 is a relay apparatus are set in advance in the guide device 11. It is assumed that the guide device 11 and the access point 50 are connected in an infrastructure mode of the wireless LAN.

However, when the printing device 21 is first used after purchase, connection setting information is not yet set in the printing device 21. Therefore, it is necessary for the user to first set the connection setting information in the printing device 21. However, in a case where the user is a beginner who is inexperienced in handling the printing device 21, wireless setting work of inputting and setting the SSID and the password to the printing device 21 by operating the operation unit 24 is relatively complex and cumbersome. Therefore, in this embodiment, if the user sets the setup disk 60, which is shipped when purchasing the printing device 21, in the insertion opening 12A of the guide device 11, a wireless setting guide program is automatically loaded from the setup disk 60 by the reading device in the guide device 11, and is installed in the guide device 11. The CPU which is the first control unit 15 executes the installed wireless setting guide program, and thus the first control unit 15 functions as respective units 151 to 155. The SSID for a temporary connection which is generated during the installation of the wireless setting guide program is written into the storage unit 17 in the first control unit 15 of the guide device 11. In addition, the SSID for a temporary connection is written in the storage unit 34 in the second control unit 31 of the printing device 21, for example, before the product is shipped. The SSID for a temporary connection is a code which is common to various models of printing devices 21 as an example, but may be separate codes for respective printing devices 21.

Figure 6:
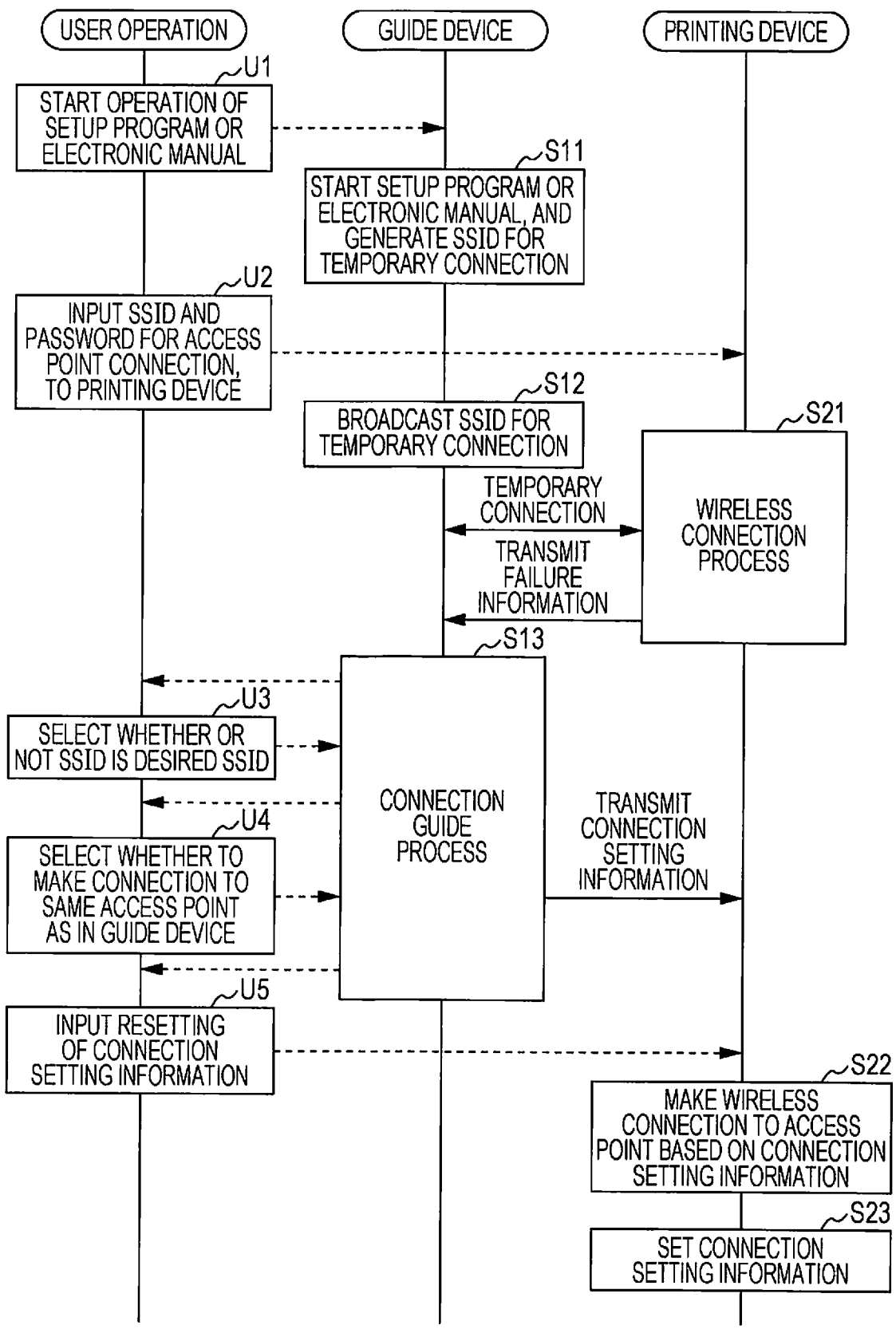
FIG. 6 is a sequence diagram illustrating a process including a wireless connection process and a connection guide process.

The process which is illustrated in FIG. 6 and executed by the guide device 11 is activated by the user performing an operation to set the setup disk 60, which has been shipped with the printing device 21, into the insertion opening 12A so as to activate a setup program, or by the user performing an operation to select a corresponding item in the electronic manual displayed on the display unit 14 of the guide device 11 by using the operation unit 13 (U1). When the setup disk 60 is set, the setup program is automatically loaded into the first control unit 15 from the setup disk 60, and is activated. In addition, in a case where the corresponding item of the electronic manual is selected, the setup program to be linked is activated. Then, the SSID for a temporary connection is generated at the same time as the activation of the setup program (S11). In this case, the SSID for a temporary connection is generated with the same code as the SSID for a temporary connection which is set in advance in the wireless communication apparatus 20.

After generating the SSID for a temporary connection, the guide device 11 disconnects the connection to the wireless LAN of the access point 50 in the infrastructure mode, as necessary, and broadcasts the SSID for a temporary connection by using the function of soft AP 153 (S12).

As illustrated in FIG. 6, the user inputs an SSID and a password for an access point connection, to the printing device 21 (U2). The printing device 21 which receives the input performs a wireless connection process (S21). In the wireless connection process, if the SSID is found by scanning the input SSID, a connection is made to the wireless LAN of the access point 50.

Here, in a case where the user inputs incorrect connection setting information, such as one in which the user makes an input error, the printing device 21 fails in the establishment of a wireless connection, because passwords do not match or an SSID is not found.

In the wireless connection process (S21), in a case where wireless connection to the access point 50 fails, the printing device 21 is temporarily connected to the guide device 11 based on the SSID for a temporary connection. The printing device 21 notifies the guide device 11 of the connection error, through a wireless communication path for a temporary connection.

Upon receipt of the connection error notification, the guide device 11 performs a connection guide process (S13).

The guide device 11 receives a failure cause which is received together with the connection error notification, from the printing device 21, and the connection setting information input by the user, in the connection guide process (S13). The guide device 11 compares and analyzes the SSID and the password that are included in the connection setting information which is input from the user, with the SSID and the password which are included in the connection setting information which is stored in the storage unit 17, and displays the guide screens 71 and 72 including the connection setting information which is estimated as being correct from the analysis result, on the display unit 14 so as to send a notification to the user.

For example, in a case where the passwords match and the SSIDs do not match, the guide screen 71 illustrated in FIG. 3 is displayed. The user views the guide screen 71, and checks whether or not the SSID is the desired SSID (U3). Specifically, the user views the guide screen 71, and if the presented SSID is a desired SSID, the user operates the YES button 71Y by operating the operation unit 13 so as to connect to the access point 50 which is specified by the SSID. Upon receipt of an input checking the desired SSID, the guide device 11 transmits the connection setting information to the printing device 21. Upon receipt of the connection setting information, the printing device 21 is wirelessly connected to the access point 50 based on the connection setting information (S22). If the wireless connection is established, the connection setting information at this time is stored in the storage unit 34, and thus the connection setting information is set in the printing device 21 (S23).

Figure 7:
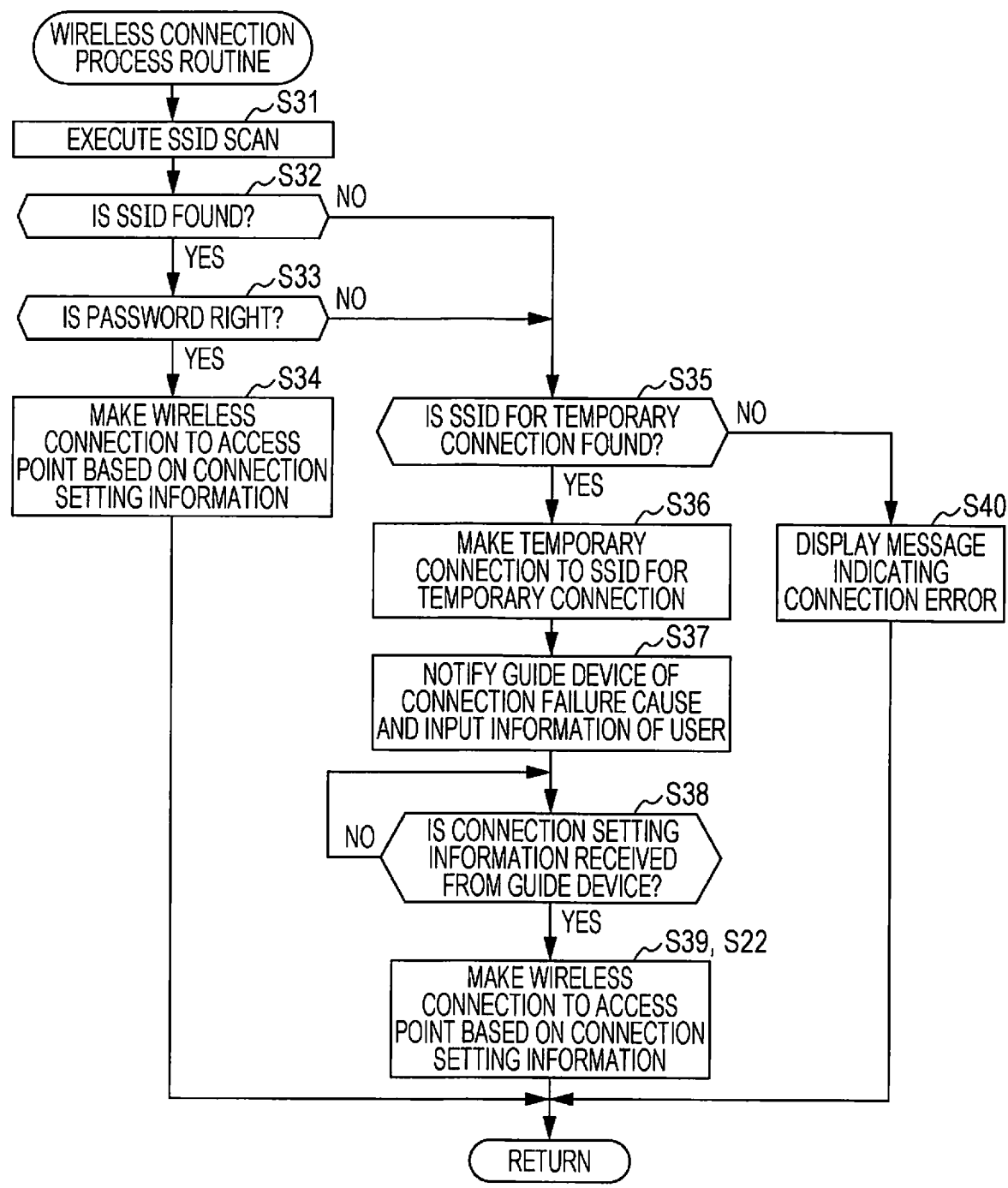
FIG. 7 is a flowchart illustrating a wireless connection process routine.

In contrast, in a case where the user inputs that the presented SSID is not the desired SSID by selecting the NO button 71N on the guide screen of FIG. 7 by operating the operation unit 13, the guide device 11 displays the guide screen 72 illustrated in FIG. 4. A message inquiring of the user, whether to connect to the SSID of the same access point 50 which is already set in the guide device 11 is displayed on the guide screen 72 illustrated in FIG. 4. When the user intends to make a connection to the same access point as in the guide device 11, the user operates the YES button 72Y by operating the operation unit 13.

In a case where the guide device 11 receives an input for checking the connection to the same access point as in the guide device 11, the guide device 11 transmits the same connection setting information as in the guide device 11 to the printing device 21. Upon the receipt of the connection setting information, the printing device 21 makes a connection to the same access point 50 as in the guide device 11, based on the connection setting information (S22). If a wireless connection is established, the connection setting information at that time is stored in the storage unit 34, and thus the connection setting information is set in the printing device 21 (S23).

In addition, in a case where the user selects the NO button 72N indicating that a connection is not to be made to the same access point 50 as in the guide device 11, on the guide screen 72 illustrated in FIG. 4, by operating the operation unit 13 (U4), the guide device 11 receives an input for checking that a connection is not to be made to the same access point 50 as itself. The guide device 11 that receives the check input displays the guide screen 73 illustrated in FIG. 5 informing of a re-setting method, on the display unit 14. The user resets the connection setting information in the printing device 21, according to the re-setting operation method that is indicated on the guide screen 73 illustrated in FIG. 5. Upon receipt of the connection setting information that is input by the user performing the re-setting operation, the printing device 21 establishes a wireless connection to the same access point 50 as in the guide device 11, based on the connection setting information (S22). If the wireless connection is established, the connection setting information at that time is stored in the storage unit 34, such that the connection setting information for the re-setting is set in the printing device 21 (S23).

Next, the wireless connection process (S21 in FIG. 6) that the printing device 21 performs will be described in detail with reference to FIG. 7. If the user inputs the SSID and the password for an access point connection, and performs an operation for connection by operating the operation unit 24, the wireless connection process is performed by the second control unit 31 of the printing device 21.

At first, in step S31, an SSID scan is executed. At this time, the first connection processing unit 314 searches for an SSID from the connection setting information that is input by the user (S31). Next, it is determined whether an SSID is found (S32), and if the SSID is found (positive determination at S32), it is determined whether a password is right (S33). If the password is right (positive determination at S33), a wireless connection is established to the access point 50 based on the connection setting information input by the user (S34). In addition, in the present embodiment, the process of steps S31 to S34 corresponds to an example of a first connection process step.

In a case where the SSID cannot be found due to an input error of an SSID by the user (negative determination in S32), or in a case where the SSID input by the user is correct but an incorrect password is input (negative determination in S33), the process proceeds to step S35. Therefore, in a case where the connection to the access point 50 fails, it is specified that the failure is caused by the fact that an SSID is not found, or the fact that the SSID is correct but the passwords do not match.

In a case where connection fails in this way, the temporary connection processing unit 312 determines whether or not the SSID for a temporary connection is found (S35). If the SSID for a temporary connection cannot be found (negative determination in S35), the second control unit 31 displays a message indicating a connection error (S40). For example, when the user does not set the setup disk 60 in the guide device 11, or a corresponding item of the electronic manual is not activated, the wireless setting guide program is not executed, such that the SSID for a temporary connection is not broadcast. In such a case, the SSID for a temporary connection cannot be found. Meanwhile, when the user sets the setup disk 60 in the guide device 11 or a corresponding item of the electronic manual is activated, the wireless setting guide program is executed, and the SSID for a temporary connection is broadcast. Thus, the SSID for a temporary connection is found (positive determination in S35).

In a case where the SSID for a temporary connection is found, the temporary connection is made to the SSID for a temporary connection (S36). In other words, the temporary connection processing unit 312 of the printing device 21 establishes the temporary connection with the wireless connection processing unit 151 of the guide device 11 based on the SSID for a temporary connection, through wireless communication between the wireless communication units 32 and 16 (S36). In addition, in the present embodiment, the process of steps S35 and S36 corresponds to an example of the temporary connection processing step.

Next, the connection guide unit 316 of the first connection processing unit 314 notifies the guide device 11 of the cause of a failure of establishment of a wireless connection based on the SSID of the access point 50 that is input by the user, and the information that is input by the user, through a wireless communication path of a temporary connection to the guide device (S37). The connection guide unit 152 in the guide device 11 is notified of the failure cause and the connection setting information. In the connection guide unit 152, the analysis unit 155 searches for correct connection setting information which is estimated based on the failure cause and the connection setting information, displays the guide screens 71 and 72 on the display unit 14 so as to notify the user of the correct connection setting information, and checks whether to perform a wireless connection to the access point which is a connection destination, based on the connection setting information. Upon receipt of a check input when the user who views the guide screen checks the connection to the access point based on the connection setting information, by operating the operation unit 13, the connection guide unit 152 transmits the connection setting information to the printing device 21 through a wireless communication path for a temporary connection.

In the printing device 21, the second connection processing unit 315 determines whether or not the connection setting information is received from the guide device 11 (S38). If the connection setting information is not received from the guide device 11 (negative determination in S38), the printing device 21 is on standby until it is received. If the connection setting information is received from guide device 11 (positive determination in S38), the wireless connection to the access point 50 is made based on the connection setting information (S39). In addition, in the present embodiment, the process of steps S38 and S39 corresponds to an example of the second connection process step.

Next, the connection guide process (S13 in FIG. 6) that the guide device 11 performs will be described in detail with reference to FIG. 8. The connection guide process is performed by the connection guide unit 152 executing the connection guide processing routine illustrated in FIG. 8, when the guide device 11 receives the information on the connection failure cause and the connection setting information from the printing device 21.

At first, in step S51, it is determined whether the failure is caused by an SSID not being found (S51). If the failure is caused by an SSID not being found (positive determination at S51), the analysis unit 155 compares the connection setting information that the guide device 11 stores with the connection setting information input by the user (S52). The connection setting information stored in the guide device 11 includes the SSID that is set in the guide device 11, and the connection setting information that was stored in the storage unit 17 as the history information when a wireless connection was established in the past.

Next, it is determined whether or not there is an SSID for which the password matches the password input by the user (S53). If there is an SSID associated with the password that matches the password input by the user (positive determination in S53), the SSID for which the password matches is displayed, and it is checked whether or not the displayed SSID is a desired SSID (S54). In other words, the checking unit 156 of the connection guide unit 152 displays the guide screen 71 that is illustrated in FIG. 3 when the passwords match, on the display unit 14. If the displayed SSID is the desired SSID, the user who views the guide screen 71 selects the YES button 71Y by operating the operation unit 13. In contrast, if the displayed SSID is not the desired SSID, the user selects the NO button 71N by operating the operation unit 13. If the signal from the operation unit 13 is the selection of the YES button 71Y, the checking unit 156 determines that it is the desired SSID (positive determination in S55). In contrast, if the signal is the selection of the NO button 71N, the checking unit 156 determines that the displayed SSID is not the desired SSID (negative determination in S55). If the displayed SSID is the desired SSID, connection setting information including the desired SSID is transmitted to the printing device 21 (S62).

Meanwhile, in a case where there is no SSID that matches the password that is input by the user (negative determination in S53), if the displayed SSID is not the desired SSID on the guide screen 71 illustrated in FIG. 3 (negative determination in S55), the process proceeds to step S59.

Further, in a case where an SSID is found and the failure is not caused by an SSID not being found (negative determination at S51), it is determined whether or not the failure is caused by disagreement of passwords (S56). In a case where the failure is not caused by disagreement of passwords (negative determination at S56), the process proceeds to step S59. In a case where the failure is caused by disagreement of passwords (positive determination at S56), the connection setting information stored in the guide device 11 is compared with the connection setting information input by the user (S57).

Next, it is determined whether or not there is password information of the SSID input by user (S58). In a case where there is no password information of the SSID that is input by the user (negative determination in S58), the process proceeds to step S59. Meanwhile, in a case where there is password information of the SSID that is input by the user (positive determination in S58), the connection setting information including the password information is transmitted to the printing device 21 (S62).

In step S59, the SSID of the access point 50 to which the guide device 11 is connected is displayed (S59). In other words, the checking unit 156 displays the guide screen 72 illustrated in FIG. 4, on the display unit 14, and displays the SSID of the access point to which the guide device 11 is connected. In a case of connecting to the same access point as in the guide device 11, the user who views the guide screen 72 selects the YES button 72Y on the guide screen 72 by operating the operation unit 13. In contrast, in a case of not connecting to the same access point as in the guide device 11, the user selects the NO button 72N on the guide screen 72 by operating the operation unit 13.

It is determined whether or not a connection to the same access point as in the guide device is approved (S60). If a signal from the operation unit 13 indicates the selection of the YES button 72Y, the checking unit 156 determines that the connection to the same access point as in the guide device is approved (positive determination in S60), and transmits the connection setting information including the SSID and the password which are already set in the guide device 11, to the printing device 21 (S62). In contrast, if a signal from the operation unit 13 indicates the selection of the NO button 72N, the checking unit 156 determines that the connection to the same access point as in the guide device 11 is not approved (negative determination in S60), and displays a re-setting method guide (S61). In other words, the checking unit 156 displays a re-setting method guide screen 73 illustrated in FIG. 5. The user views the re-setting method guide screen 73, and re-sets a desired connection setting information by operating the operation unit 24 of the printing device 21.

According to the first embodiment described above, the effects described below can be achieved.

(1) In a case where the first connection processing unit 314 fails in the wireless connection process with the access point 50 (an example of the relay apparatus), the temporary connection processing unit 312 searches for the wireless setting-completed apparatus 10, and performs a temporary connection to the wireless setting-completed apparatus 10 which is found from the searching. The second connection processing unit 315 acquires the connection setting information for a connection to the access point 50, from the wireless setting-completed apparatus 10 through the temporary connection, and performs a wireless connection to the access point 50 based on the connection setting information. Thus, even if the wireless communication apparatus 20 fails in the wireless connection process with the access point 50, it is possible to perform a wireless connection to the desired access point 50 relatively smoothly thereafter, thereby avoiding a situation where the wireless connection to the access point 50 is not possible.

(2) The first connection processing unit 314 compares connection setting information that is input with connection setting information of the wireless setting-completed apparatus 10, and outputs a comparison result to the display unit 14 (an example of the output unit) so as to notify a user of the comparison result. The user can check correct connection setting information to be input, from the displayed comparison result. Therefore, if the user performs an operation of checking correct connection setting information that is output, the wireless communication apparatus 20 can be relatively quickly connected to the access point 50 in a wireless manner. In addition, correct connection setting information may be re-input or may be selected from a list, or a candidate for the connection setting information may be checked, on the guide screen that is displayed after the connection fails.

(3) The user who views the comparison result displayed on the display unit 14 checks correct connection setting information, and performs an operation to allow wireless connection based on the correct connection setting information. The second connection processing unit 315 performs a wireless connection to the access point 50 based on the correct connection setting information which is received by the check input based on the operation. Thus, even if the first connection processing unit 314 fails in the wireless connection process with the access point 50 due to incorrect connection setting information because of the input error performed by the user, the wireless communication apparatus 20 is able to be wirelessly connected to the access point 50.

(4) The first connection processing unit 314 performs analysis of comparing at least the network identification information (for example, SSID) of the input connection setting information and at least the network identification information of the connection setting information of the wireless setting-completed apparatus 10. Since the user is notified of the comparison result obtained from the analysis, the user who views the comparison result checks correct connection setting information, and performs a check input operation that permits a wireless connection based on the correct connection setting information. The second connection processing unit 315 performs a wireless connection to the access point 50 based on the correct connection setting information which is received by the check input. Thus, even if the first connection processing unit 314 fails in the wireless connection process with the access point 50 due to incorrect connection setting information because of the input error performed by the user, the wireless communication apparatus 20 is able to be wirelessly connected to the access point 50, by only performing a checking operation according to the instruction on the next guide screen.

(5) In a case where the wireless communication apparatus 20 is configured to include the analysis unit 317 which is indicated by the two-dot chain line in FIG. 2, the first connection processing unit 314 displays a difference between the correct connection setting information which is acquired from the wireless setting-completed apparatus 10 through the temporary connection and is stored as connection history and the connection setting information that is input by the user, on the display unit 25. Thus, the user can relatively quickly recognize the correct connection setting information from the difference displayed on the display unit 25.

(6) In a case where the network identification information pieces (for example, the SSIDs) do not match and the passwords match, from the comparison result generated by the analysis unit 155 (or 317), network identification information corresponding to the password is displayed on the display unit 14 (or 25), and a message for checking whether the network identification information indicates a connection destination is also displayed. Upon receipt of a check input indicating the connection destination, the wireless communication apparatus 20 performs a wireless connection to the access point 50 based on the network identification information. Thus, in a case of a failure where the network identification information (for example, the SSID) does not match, and the password matches, it is possible to relatively quickly connect the wireless communication apparatus 20 to the correct access point 50 thereafter.

(7) The wireless communication system WCS includes a wireless setting-completed apparatus 10 in which connection setting information required for a connection to an access point 50 is already set, and a wireless communication apparatus 20. The wireless communication apparatus 20 performs a connection process for a connection to the access point 50 based on the first connection setting information which is input. In a case where connection to the access point 50 fails from the connection process, the wireless communication apparatus 20 acquires the first connection setting information, and one or more pieces of second connection setting information that the wireless setting-completed apparatus 10 stores as connection history. The analysis unit 155 (or 317) that is provided in at least one of the wireless communication apparatus 20 and the wireless setting-completed apparatus 10 compares the first connection setting information with the second connection setting information. The comparison result generated by the analysis unit 155 (or 317) is displayed on the display unit 14 of the wireless setting-completed apparatus 10, or the display unit 25 of the wireless communication apparatus 20. Thus, even if the wireless communication apparatus 20 fails in the wireless connection process with the access point 50, the user checks the comparison result which is displayed on the display unit, and is likely to know the correct connection setting information relatively quickly, such that the wireless communication apparatus 20 can be wirelessly connected to the desired access point 50 relatively smoothly.

Second Embodiment

Figure 10:
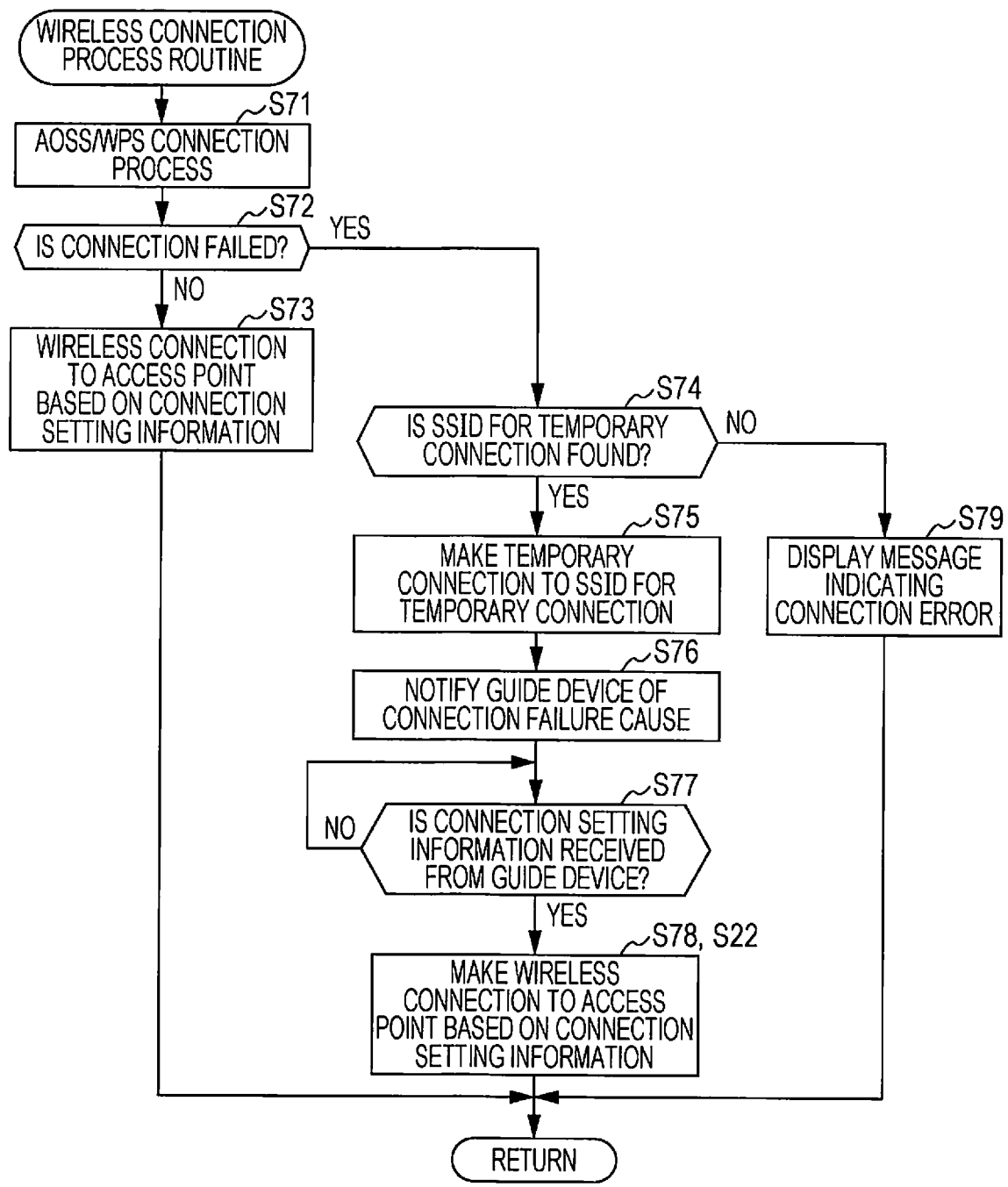
FIG. 10 is a flowchart illustrating a wireless connection process routine.
Figure 11:
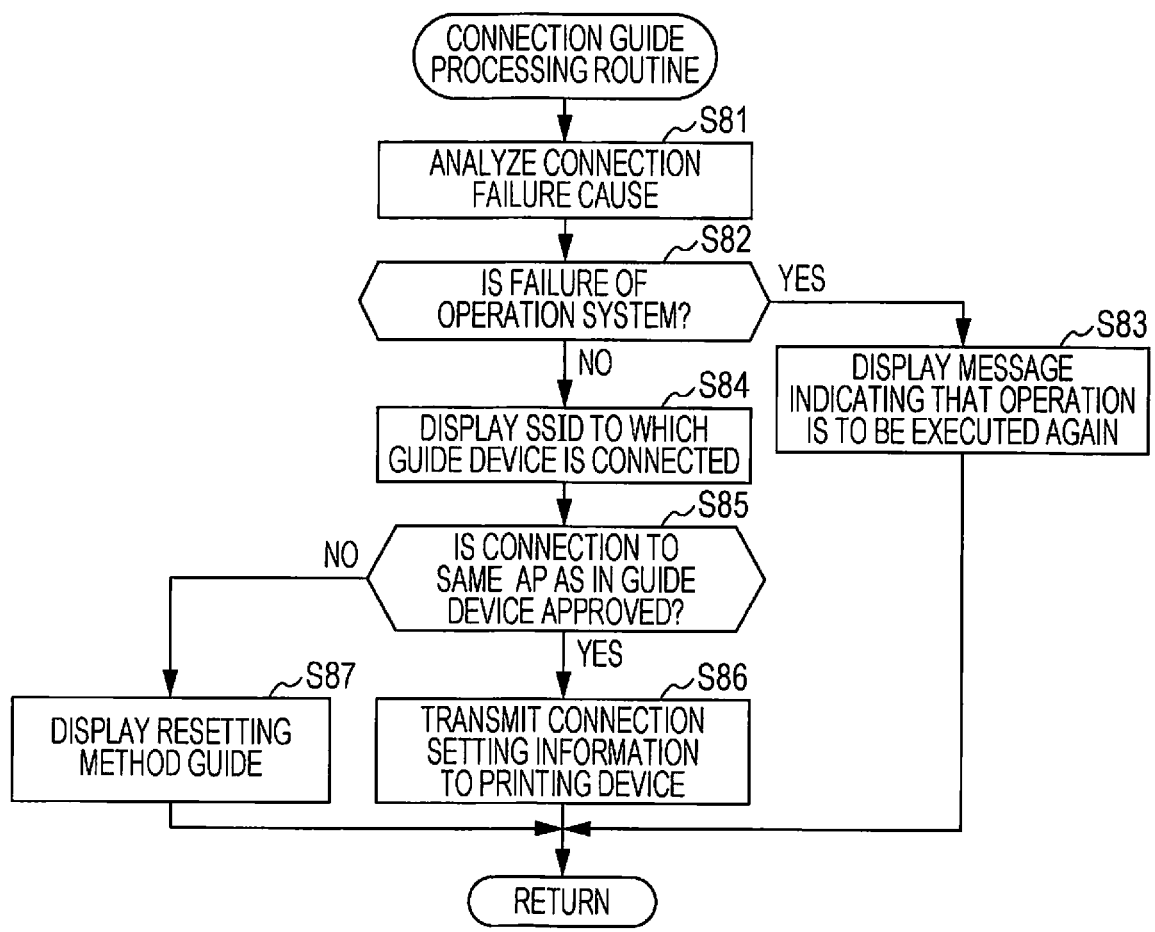
FIG. 11 is a flowchart illustrating a connection guide processing routine.

Next, a second embodiment will be described with reference to FIG. 9 to FIG. 11. A wireless communication system WCS according to the present embodiment employs a push button type connection setting method capable of performing connection setting of communication with the access point 50 in the wireless communication apparatus 20, if a predetermined operation button 24B provided in the wireless communication apparatus 20 and the push button 50A provided in the access point 50 are pressed down. In addition, in the present embodiment, the predetermined operation button 24B that is operated to activate a connection setting process according to the push button type connection setting method corresponds to an example of a predetermined button.

If the respective predetermined buttons 24B and 50A of the wireless communication apparatus 20 and the access point 50 are pressed down in the push button type connection setting method, the wireless communication apparatus 20 performs an AOSS/WPS connection process of performing connection setting of communication with the access point 50, in response to the press. Here, "AOSS" is a simple setting function provided in a wireless LAN router manufactured by Buffalo Co., Ltd., and the connection setting of communication is completed by simply pressing dedicated buttons in the corresponding apparatuses. Further, "WPS (Wi-Fi Protected Setup)" is a standard that enables easy setting between wireless LAN apparatuses. In the present embodiment, the processes by the simple setting function are collectively referred to as AOSS/WPS connection process collectively. In the present embodiment, the wireless communication apparatus 20 (the printing device 21 as an example) and the access point 50 are the corresponding apparatuses of simple setting.

After the push button connection function is activated by the operation button 24B of the wireless communication apparatus 20 being operated, if the push button 50A of the access point 50 is pressed, a wireless connection is established between the wireless communication apparatus 20 and the access point 50, and connection setting information is transmitted from the access point 50 to the wireless communication apparatus 20, such that the connection setting information is set in the wireless communication apparatus 20. In this way, the connection setting of communication is completed by simply pressing the dedicated buttons 24B and 50A in the corresponding apparatuses of simple setting. In addition, the configuration of the wireless communication system WCS is basically the same as in the first embodiment, and only the processes by the wireless setting-completed apparatus 10 and the wireless communication apparatus 20 are different.

Next, the operation of the wireless communication system WCS will be described with reference to FIG. 9 to FIG. 11. Here, a case where the wireless setting-completed apparatus 10 is the guide device 11, and the wireless communication apparatus 20 is the printing device 21 will be described as an example.

The SSID and the password (encryption key) of the wireless LAN in which the access point 50 is a relay apparatus is set in advance in the guide device 11. It is assumed that the guide device 11 and the access point 50 are connected in an infrastructure mode of the wireless LAN.

The process which is illustrated in FIG. 6 and executed by the guide device 11 is activated by the user performing an operation to set the setup disk 60 in the printing device 21 so as to activate a setup program, or by the user performing an operation to select a corresponding item of an electronic manual by using the operation unit 13 of the guide device 11 (U11). The first control unit 15 starts the setup program. The SSID for a temporary connection is generated as well as the activation of the setup program or the electronic manual (S11). In this case, the SSID for a temporary connection is generated with the same code as the SSID for a temporary connection which is set in advance in the wireless communication apparatus 20.

The guide device 11 disconnects the connection to the wireless LAN of the access point 50 in the infrastructure mode, as necessary, and broadcasts the SSID for a temporary connection by using the function of soft AP 153 (S12).

Figure 9:
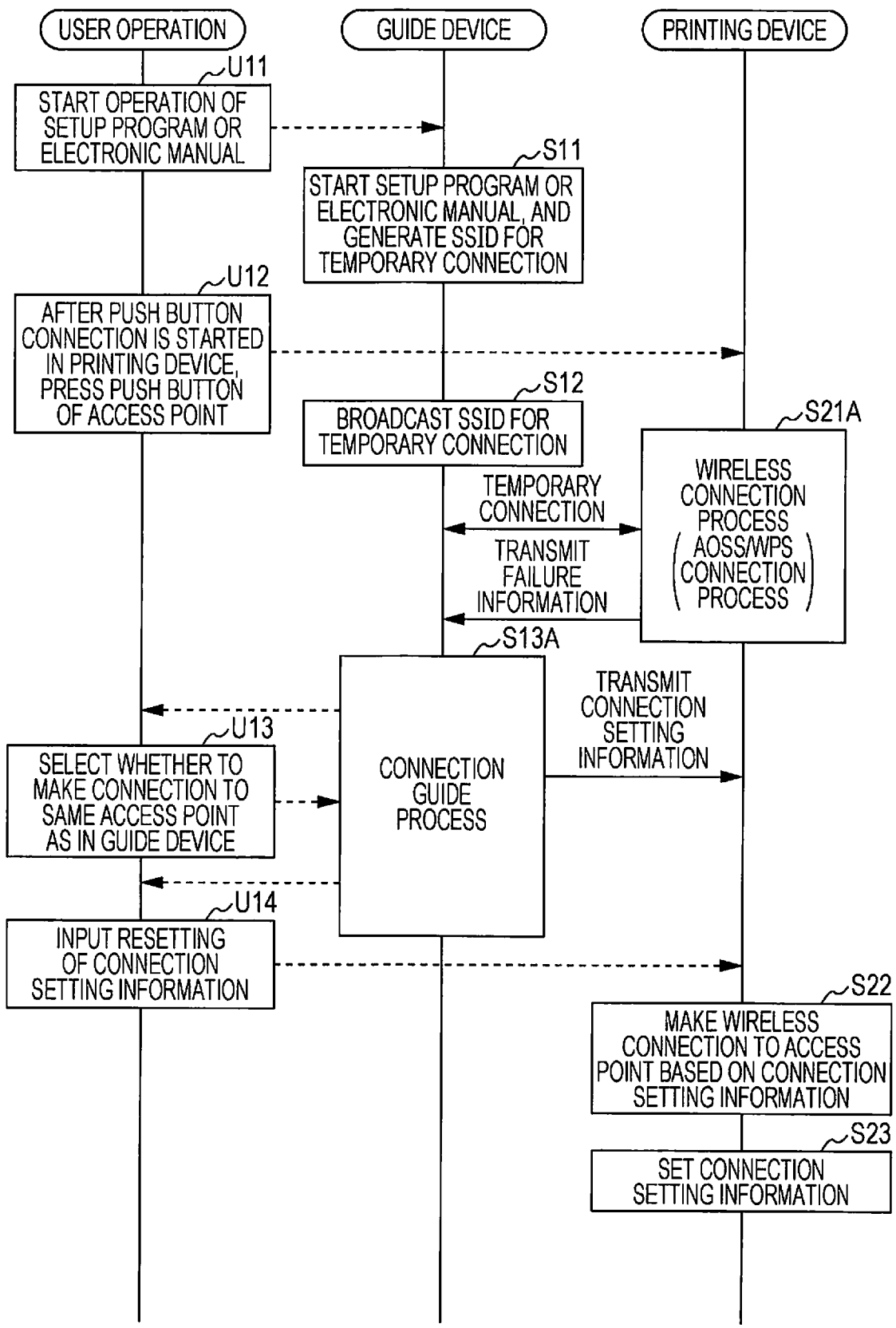
FIG. 9 is a sequence diagram illustrating a process including a wireless connection process and a connection guide process in a second embodiment.

As illustrated in FIG. 9, after the user starts a push button connection in the printing device 21, the user presses the push button 50A of the access point 50 (U11). Thus, the printing device 21 and the access point 50 perform the AOSS/WPS connection process (a simple setting process). In the AOSS/WPS connection process, a wireless communication connection is established based on the SSID for simple setting between the printing device 21 and the access point 50. If the wireless communication connection is established, connection setting information (the SSID and the password for access point connection) is transmitted from the access point 50 to the printing device 21, and the printing device 21 sets the received connection setting information in the wireless communication unit 32.

Meanwhile, the establishment of a wireless connection between the printing device 21 and the access point 50 may be failed in some case. For example, a case where the user turns off the power of the access point, or does not press the push button 50A corresponds thereto. If the establishment of a wireless connection between the printing device 21 and the access point 50 fails due to this type of cause, the printing device 21 is temporarily connected to the guide device 11 based on the SSID for a temporary connection, in the AOSS/WPS connection process (S21A). The printing device 21 transmits failure information to the guide device 11 through a wireless communication path for a temporary connection.

Upon receipt of failure information, the guide device 11 performs a connection guide process (S13A). The guide device 11 receives the failure information including the failure cause that is received from the printing device 21, in the connection guide process (S13A). The guide device 11 analyzes the failure information displays a guide screen including the analyzation result on the display unit 14. For example, causes such as a time-out due to not-pressing down the push button 50A of the access point 50, non-execution of a power-on operation of the access point 50, the printing device 21 and the access point 50 not being set in the wireless LAN corresponding apparatuses for simple setting are analyzed. When the push button 50A is not pressed down, a guide screen (not illustrated) indicating that the push button 50A is not pressed down is displayed on the display unit 14. At the time of non-execution of a power-on operation of the access point 50, a guide screen (not illustrated) indicating the non-execution of the power-on operation of the access point 50 is displayed on the display unit 14. In a case where the printing device 21 and the access point 50 are not set as corresponding apparatuses, during a normal operation when the power of the access point 50 is in an on-state and the push button 50A is pressed, the connection setting for communication fails. In this case, in a case of a communication setting problem such as in which information on the SSID for a simple connection is not associated, the guide device 11 displays the guide screen 72 illustrated in FIG. 4, on the display unit 14.

A message that makes an inquiry to the user whether to make a connection to the SSID, which is already set in the guide device 11, of the same access point 50 as in the guide device 11 is displayed on the guide screen 72 illustrated in FIG. 4. When a connection to the same access point as in the guide device 11 is possible, the user operates the YES button 72Y by operating the operation unit 13.

A connection propriety notification as to whether to perform a connection to the same access point as in the guide device 11 is received. Upon receipt of a check input indicating that the connection to the same access point as in the guide device 11 is approved by the user, the guide device 11 transmits the connection setting information which is set in itself, to the printing device 21. The printing device 21 performs a connection process which establishes the wireless connection to the same access point 50 as in the guide device 11 based on the connection setting information which is received from the guide device 11 (S22). The printing device 21 sets the connection setting information when the wireless connection is established, in the wireless communication unit 32 (S23). Specifically, the printing device 21 performs a setting process of setting the connection setting information in the printing device 21 by writing the connection setting information into a predetermined storage area of the storage unit 34 which is referred to when the wireless communication unit 32 performs a wireless communication connection process.

In a case where the user selects the NO button 72N on the guide screen 72 illustrated in FIG. 4 by operating the operation unit 13 (U4), the guide device 11 receives a notification indicating that a connection to the same access point 50 as in itself is not approved. The guide device 11 that receives the notification displays the guide screen 73 illustrated in FIG. 5 informing a re-setting method, on the display unit 14. The user resets the connection setting information in the printing device 21, by operating the operation unit 24 according to the re-setting operation method on the guide screen 73 illustrated in FIG. 5. Upon receipt of the connection setting information that is input by the user performing the re-setting operation, the printing device 21 establishes a wireless connection to the access point 50 based on the connection setting information (S22). If the wireless connection is established, the connection setting information for the re-setting at that time is set in the wireless communication unit 32 of the printing device 21 (S23).

Next, the wireless connection process (including an AOSS/WPS connection process) that the printing device 21 of the present embodiment performs as the process of S21A in FIG. 9 will be described in detail with reference to FIG. 10. After the user performs an operation to start the push-button connection process on the printing device 21, if the user presses down the push button 50A of the access point 50, the AOSS/WPS connection process in the wireless connection process is performed by the second control unit 31 of the printing device 21.

At first, in step S71, the AOSS/WPS connection process is executed. At this time, wireless connection is automatically performed by a simple setting function between the printing device 21 and the access point 50. The first connection processing unit 314 searches for an SSID for a simple connection by an AOSS/WPS connection processing program, and if the SSID for a simple connection is found, the wireless connection is established to the access point 50 based on the SSID.

In contrast, in a case where there is an error in an operation system such as a time-out due to not-pressing down the push button 50A, or non-execution of a power-on operation of the access point 50, a wireless connection fails. In a case where there is an error in a communication setting system such as in which the printing device 21 and access point 50 are not set in a simple setting processing apparatus, a wireless connection fails.

The second control unit 31 determines whether or not the connection by the AOSS/WPS connection process (S71) fails (S72). If the connection is successful (negative determination at S72), wireless connection to the access point 50 is made based on the connection setting information (S73). In addition, in the present embodiment, the process of step S71 to S73 corresponds to an example of a first connection process step.

In contrast, in a case where a connection fails (positive determination in S72), it is determined whether or not the temporary connection processing unit 312 finds the SSID for a temporary connection (S74). When the user sets the setup disk 60 in the guide device 11, or performs a corresponding item of an electronic manual, the wireless setting guide program is executed, and the SSID for a temporary connection is broadcast. Thus, the SSID for a temporary connection is found (positive determination in S74). In a case where the SSID for a temporary connection is found, the printing device 21 is temporarily connected to the SSID for a temporary connection (S75). In other words, the temporary connection processing unit 312 of the printing device 21 establishes the temporary connection to the wireless connection processing unit 151 of the guide device 11 based on the SSID for a temporary connection, through wire communication between the wireless communication units 32 and 16. In addition, in the present embodiment, the process of steps S74 and S75 corresponds to an example of the temporary connection processing step.

Next, the connection guide unit 316 of the first connection processing unit 314 notifies the guide device 11 of the connection failure cause why the wireless connection to the access point 50 based on the connection setting information that is input by the user fails, through a wireless communication path for a temporary connection (S76). The connection guide unit 152 in the guide device 11 is notified of the connection failure cause. In the connection guide unit 152, when there is an operation error, the analysis unit 155 displays the guide screen depending on the connection failure cause on the display unit 14, and informs the user that an operation is to be re-performed. For example, when the push button 50A is not pressed down, a guide screen (not illustrated) indicating that the push button 50A is not pressed down is displayed on the display unit 14. At the time of non-execution of a power-on operation of the access point 50, a guide screen (not illustrated) indicating the non-execution of the power-on operation of the access point 50 is displayed on the display unit 14.

In a case where there is an error in a communication setting system such as in which the printing device 21 and the access point 50 are not set as corresponding apparatuses, and the information of the SSID for a simple connection is not associated, during a normal operation when the power of the access point 50 is in an on-state and the push button 50A is pressed, a wireless connection fails. In this case, the guide device 11 displays the connection setting information for the same access point 50 as in itself, and the guide screen 72, illustrated in FIG. 4, for checking whether to connect to the connection setting information, on the display unit 14.

If the user who views the guide screen 72 checks the connection to the same access point 50 as in the guide device 11 by operating the operation unit 13, the connection guide unit 152 receives the check input based on the operation. Upon receipt of the check input, the connection guide unit 152 transmits the connection setting information of the same access point 50 as in the guide device 11 to the printing device 21 through a wireless communication path for a temporary connection.

In the printing device 21, the second connection processing unit 315 determines whether or not the connection setting information is received from the guide device 11 (S77). If the connection setting information is not received from the guide device 11 (negative determination in S77), the printing device 21 is on standby as it is until the reception. If the connection setting information is received from the guide device 11 (positive determination in S77), the printing device 21 is wirelessly connected to the access point 50 based on the connection setting information (S78 (S22)). In addition, in the present embodiment, the process of steps S77 and S78 corresponds to an example of the second connection process step.

Meanwhile, in a case where the SSID for a temporary connection cannot be found (negative determination in S74), a message indicating a connection error is displayed (S79). For example, when the user does not set the setup disk 60 in the guide device 11, or a corresponding item of the electronic manual is not activated, the wireless setting guide program is not executed and the SSID for a temporary connection is not broadcast, such that the SSID for a temporary connection cannot be found.

Next, the connection guide process (S13A in FIG. 9) that the guide device 11 performs will be described in detail with reference to FIG. 11. The connection guide process is performed by the connection guide unit 152 executing the connection guide processing routine illustrated in FIG. 11, when the guide device 11 receives the information on the connection failure cause from the printing device 21.

At first, in step S81, a connection failure cause is analyzed. The analysis unit 155 analyzes whether the failure is caused by an error in an operating system such as a time-out due to not-pressing down the push button 50A and non-execution of a power-on operation of the access point 50, or an error in a communication setting system such as in which the printing device 21 and the access point 50 are not set in the corresponding apparatuses of simple setting. The checking unit 156 determines whether the failure is caused by a failure of the operation system (S82), and in a case of the failure of the operation system (positive determination in S82), a message indicating that an operation is to be re-performed is displayed on the display unit 14 (S83). As the message indicating that an operation is to be re-performed, for example, a message indicating "turn on the power of the access point 50" is displayed, or a message indicating "press down the push button 50A" is displayed. In contrast, in a case of the failure of the communication setting system (negative determination in S82), the checking unit 156 displays the SSID of the access point to which the guide device 11 is connected (S84). In other words, the checking unit 156 displays the guide screen 72 illustrated in FIG. 4 on the display unit 14.

In a case of connecting to the same access point 50 as in the guide device 11, the user who views the guide screen 72 selects the YES button 72Y on the guide screen 72 by operating the operation unit 13. In contrast, in a case of not connecting to the same access point as in the guide device 11, the user selects the NO button 72N on the guide screen 72 by operating the operation unit 13.

The checking unit 156 determines whether or not a connection to the same access point as in the guide device is approved (S85). If a signal from the operation unit 13 indicates the selection of the YES button 72Y, the checking unit 156 determines that the connection to the same access point as in the guide device is approved (positive determination in S85), and transmits the connection setting information including the SSID and the password which are already set in the guide device 11, to the printing device 21 (S86). In contrast, if a signal from the operation unit 13 indicates the selection of the NO button 72N, the checking unit 156 determines that the connection to the same access point as in the guide device 11 is not approved (negative determination in S85), and displays a re-setting method guide (S87). In other words, the checking unit 156 displays a re-setting method guide screen 73 illustrated in FIG. 5. The user views the re-setting method guide screen 73, and re-sets a desired connection setting information by operating the operation unit 24 of the printing device 21.

According to the second embodiment described above in detail, the effects of (1) to (7) described in the first embodiment are achieved, and as well as the following effects can be achieved.

(8) In a case where a wireless connection to the access point 50 fails with a push button type connection setting method capable of performing connection setting of communication with the access point 50 if predetermined buttons 24B and 50A are pressed down, between the wireless communication apparatus 20 and the access point 50 which correspond to the simple setting, the wireless communication apparatus 20 is temporarily connected to the wireless setting-completed apparatus 10. The wireless setting-completed apparatus 10 transmits the connection setting information which is already set in itself, to the printing device 21, through a wireless communication path for a temporary connection. Thus, the printing device 21 can be wirelessly connected to the same access point 50 as in the wireless setting-completed apparatus 10, based on the connection setting information received from the wireless setting-completed apparatus 10. For example, after the wireless connection according to the push button type connection setting method fails, it is likely to avoid a situation in which the wireless communication apparatus 20 cannot be wirelessly connected to any access point 50, without knowing the cause of the failure.

(9) In addition, in a case where a failure is due to an error in the operation system, a message indicating that an operation is to be re-performed is displayed on the display unit 14, such that the user re-performs the operation by operating the push button 50A or supplying power to the access point 50, which enables a wireless connection between the wireless communication apparatus 20 and the access point 50.

In addition, the above respective embodiments may be modified in the following forms.

Figure 8:
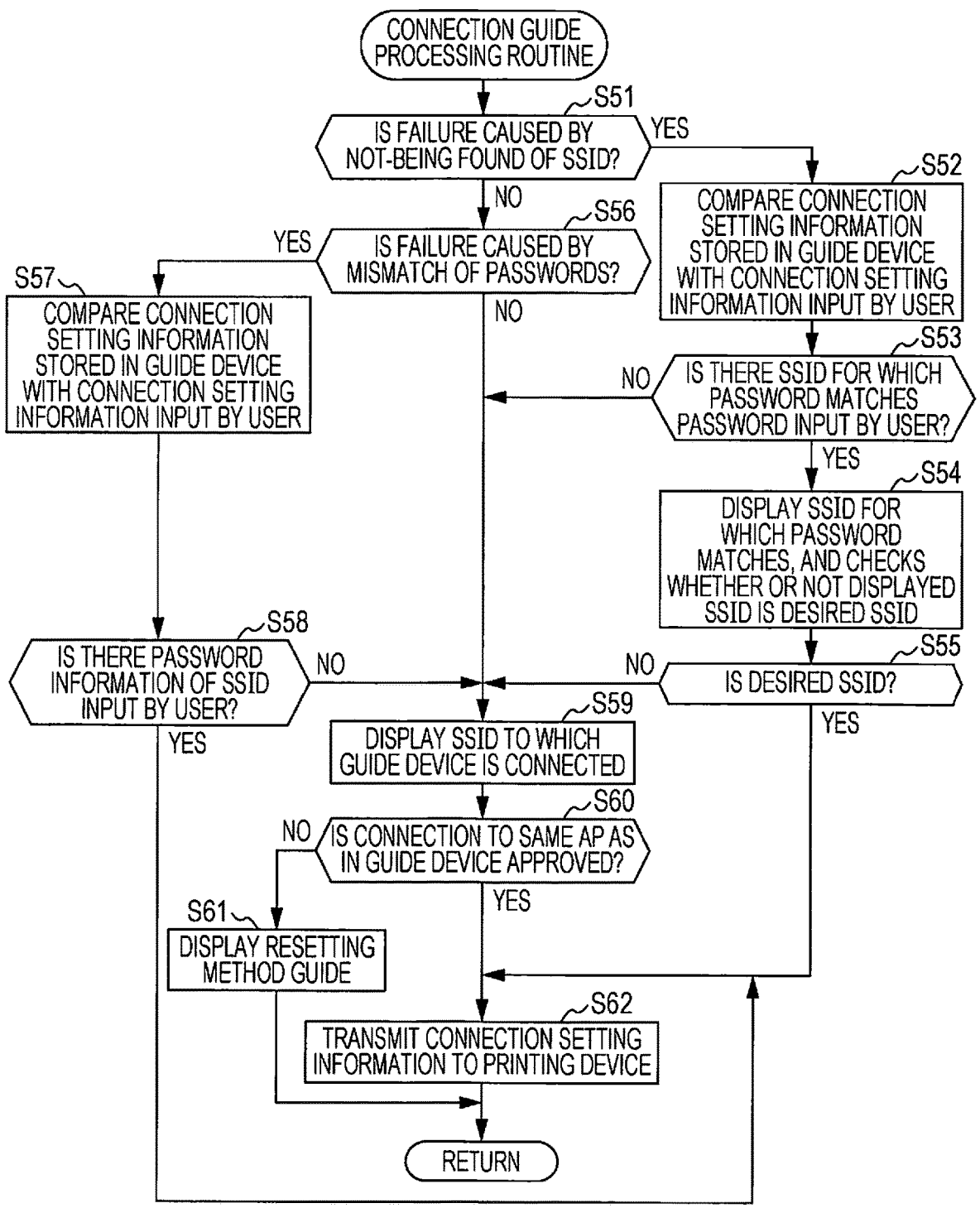
FIG. 8 is a flowchart illustrating a connection guide processing routine.

In steps S56 to S58, and S62 of FIG. 8 in the first embodiment, in a case where the connection failure cause is the disagreement of the passwords, if there is password information of the SSID that is input by the user, a guide screen for causing the user to check the password information may be displayed.

Although the first embodiment is configured such that in a case where only one of the SSID and the password, included in the connection setting information, is different, a wireless connection is made to the access point based on the correct connection setting information which is obtained by analysis, a configuration is possible in which a wireless connection is always made to the access point based on the connection setting information that is already set. In this case, although a wireless connection may automatically be made to the access point which is the connection destination without user's checking, it is preferable to obtain the user's checking for the connection destination by displaying the guide screen 72 illustrated in FIG. 4.

As the guide screen, the connection setting information which is already set in the wireless setting-completed apparatus 10 and a list of a plurality of pieces of connection setting information which were used for establishing wireless connections in the past and are stored as the history information may be displayed on the display unit. In this case, the connection setting information which is already set in the wireless setting-completed apparatus 10 is displayed and the checking is acquired at first, and in a case where the connection setting information is not the access point that the user desire, a list of a plurality of pieces of connection setting information which are stored as the history information may be displayed on the next screen.

Although the analysis unit 155 (or 317) and the checking unit 156 (or 318) are provided, a system can be configured such that only the analysis unit 155 (or 317) is provided and the checking unit 156 (or 318) is not provided. If correct connection setting information can be estimated by the analysis unit 155 (or 317), a connection may automatically be made based on the estimated connection setting information. In addition, in a configuration in which a connection is made based on the connection setting information which is already set in the wireless setting-completed apparatus 10, the analysis unit and the checking unit are abolished, and in a case where a connection to an access point input by the user fails, a wireless connection may be established without checking of the user.

Although the analysis unit and the checking unit are provided in the wireless setting-completed apparatus 10, the analysis unit and the checking unit, which are indicated by the two-dot chain lines, may be provided only in the wireless communication apparatus 20, among the apparatuses 10 and 20. In this case, the analysis unit acquires at least one of the connection setting information that is already set and the connection setting information of the history information, from the wireless setting-completed apparatus 10 through a wireless communication path for a temporary connection. Further, at least one of the analysis unit and the checking unit may be provided in at least one of the wireless setting-completed apparatus 10 and the wireless communication apparatus 20. For example, a configuration is possible in which the analysis unit may be provided in the wireless setting-completed apparatus 10 and the checking unit may be provided in the wireless communication apparatus 20, and vice versa.

In the wireless communication method for a temporary connection, at least one of the wireless setting-completed apparatus 10 and the wireless communication apparatus 20 may have an access point function. For example, the soft AP may be incorporated only in the wireless communication apparatus 20, and the soft AP may be incorporated in the wireless setting-completed apparatus 10 and the wireless communication apparatus 20. Further, at least one of the soft AP and the ad-hoc mode communication unit may be provided in the wireless communication apparatus 20.

Although the wireless connection to the access point is defined as the main connection, the connection destination of the main connection is not limited to the access point (relay apparatus), and may be a wireless apparatus such as the wireless setting-completed apparatus 10 other than the relay apparatus.

The SSID which is the network identification information may be configured to include an extended service set identifier (ESSID), and a basic service set identifier (BSSID) may be used as the network identification information, instead of the SSID. It is desirable that the connection setting information includes some pass phrases such as an encryption key in order to establish the temporary connection or the main connection, but may not necessarily include the encryption key.

Although the first operation of the power button 24A of the printing device 21 is used as the trigger to start the simple connection process, the operation of the operation button 24B in a predetermined area other than the power button 24A, which is indicated on the menu of the display unit 14, may be used as the trigger, in addition to the turn-on operation of the power button 24A. In this case, the trigger may not be the first power-on operation of the printing device 21.

Different wireless communication systems may be used for the temporary connection and the main connection. A wireless LAN may be used for the main connection, and for example, a system such as Bluetooth (registered trademark) or infrared communication (IrDA, or the like) may be used as a wireless communication system of a temporary connection, instead of the wireless LAN. Further, a system such as Bluetooth (registered trademark) or infrared communication (IrDA, or the like) may be used for the main connection, instead of the wireless LAN. In a case of a communication system other than the wireless LAN, information other than the network identification information may be searched, at the time of searching.

In the respective embodiments, the wireless setting-completed apparatus 10 is a guide device such as a PC, the wireless communication apparatus 20 is a printing device, and the connection setting information is transmitted from the PC to the printing device, but a reverse configuration is possible. In other words, a configuration is possible in which the wireless setting-completed apparatus 10 is a printing device, the wireless communication apparatus 20 is a PC, and the printing device transmits connection setting information that is already set to the PC.

In the respective embodiments, the wireless setting-completed apparatus 10 is a PC and the wireless communication apparatus 20 is a printing device, but other combination may be possible. For example, both the wireless setting-completed apparatus and the wireless communication apparatus may printing devices, or may be PCs. Further, a combination of the wireless setting-completed apparatus and the wireless communication apparatus may be a combination of a PC and a mobile terminal, or a combination of a mobile terminal and a printing device. In addition, the wireless communication apparatus 20 may be, instead of the printing device 21, a video equipment such as a scanner device (an image reading apparatus), a facsimile, a digital camera, and a projector, home appliances, a smart phone, or other electric slave device. In addition, the printing device may be a composite machine having a scan function, a facsimile function, and the like.

At least one of the first control unit 15 and the second control unit 31 is not limited to a configuration that is implemented by software by a computer executing a program, or may be implemented by, for example, hardware by an electronic circuit, or may be implemented by cooperation of software and hardware.

What is claimed is:

1. A wireless communication apparatus comprising:
    a CPU that performs a first wireless connection process for performing a wireless connection to a relay apparatus; and
    a memory that pre-stores a temporary connection identifier for a temporary connection to a wireless setting-completed apparatus in which connection setting information for a connection to the relay apparatus is already set,
    the CPU determining whether the wireless connection to the relay apparatus by the first wireless connection process has failed, and performing a second wireless connection process different from the first wireless connection process,
    the second wireless connection process including searching for the temporary connection identifier to search for the wireless setting-completed apparatus in a case where the CPU determines that the wireless connection to the relay apparatus by the first wireless connection process has failed, performing the temporary connection to the wireless setting-completed apparatus which is found from the searching, acquiring the connection setting information from the wireless setting-completed apparatus through the temporary connection, and performing a wireless connection to the relay apparatus based on the connection setting information, and
    the CPU transmitting, through the temporary connection, a failure information of the first wireless connection process and a connection setting information that has been utilized by the first wireless connection process that has failed to the wireless setting-completed apparatus, and acquiring, through the temporary connection, a connection setting information of the wireless setting-completed apparatus that has been transmitted based on a determination of the wireless setting-completed apparatus based on the failure information, the connection setting information that has been utilized by the first wireless connection process that has failed, and the connection setting information of the wireless setting-completed apparatus.

2. The wireless communication apparatus according to claim 1,
    wherein the CPU compares connection setting information that is input with the connection setting information of the wireless setting-completed apparatus, and outputs a comparison result to an output unit so as to notify a user of the comparison result.

3. The wireless communication apparatus according to claim 2,
    wherein the output unit outputs the comparison result, and
    wherein the CPU receives a check input in which a user checks correct connection setting information based on the comparison result, and performs a wireless connection to the relay apparatus based on the connection setting information which is received by the check input.

4. The wireless communication apparatus according to claim 3,
    wherein the CPU compares at least network identification information pieces of the connection setting information, and outputs a comparison result to the output unit, and
    wherein the CPU receives a check input in which a user checks correct network identification information, and performs a wireless connection to the relay apparatus based on the network identification information which is received by the check input.

5. The wireless communication apparatus according to claim 2,
    wherein the memory stores connection setting information pieces by which the CPU can perform a connection, as connection history,
    wherein the CPU outputs a difference between correct connection setting information of the connection history and connection setting information which is input by an operation unit, as the comparison result, to the output unit.

6. The wireless communication apparatus according to claim 5,
    wherein the connection setting information includes network identification information and a password,
    wherein the wireless communication apparatus further comprises
    a checking unit that in a case where the network identification information pieces do not match and the passwords matches, from the comparison result, displays the network identification information corresponding to the password, and displays a message for checking whether or not the network identification information indicates a connection destination, on a display unit, and
    wherein upon receipt of a check input indicating the connection destination, the CPU performs a wireless connection to the relay apparatus based on the network identification information.

7. The wireless communication apparatus according to claim 1,
    wherein the CPU performs a wireless connection to the relay apparatus, with a push button type connection setting method capable of performing connection setting of communication with the relay apparatus if a predetermined button is pressed down,
    wherein in a case where the wireless connection to the relay apparatus with the push button type connection setting method fails, the CPU performs a temporary connection to the wireless setting-completed apparatus, and
    wherein the CPU performs a wireless connection to the relay apparatus, based on the connection setting information acquired from the wireless setting-completed apparatus through the temporary connection.

8. The wireless communication apparatus according to claim 1,
    wherein the wireless connection process includes a push button type connection process.

9. The wireless communication apparatus according to claim 1,
    wherein the wireless communication apparatus is a printing device.

10. The wireless communication apparatus according to claim 1,
wherein the temporary connection identifier is pre-stored in the memory before the wireless communication apparatus is shipped.

11. A wireless communication system that includes a wireless setting-completed apparatus in which connection setting information required for a connection to a relay apparatus is already set, and a wireless communication apparatus,
wherein the wireless communication apparatus pre-stores a temporary connection identifier for a temporary connection to the wireless setting-completed apparatus, performs a first connection process for a connection to the relay apparatus based on first connection setting information which is input, determines whether the connection to the relay apparatus by the first connection process has failed, and performs a second connection process different from the first connection process,
wherein the second connection process includes searching for the temporary connection identifier to search for the wireless setting-completed apparatus in a case where the connection to the relay apparatus by the first connection process has failed,
wherein the wireless communication apparatus transmits, through the temporary connection, a failure information of the first connection process and a connection setting information that has been utilized by the first connection process that has failed to the wireless setting-completed apparatus, and acquires, through the temporary connection, a connection setting information of the wireless setting-completed apparatus that has been transmitted based on a determination of the wireless setting-completed apparatus based on the failure information, the connection setting information that has been utilized by the first connection process that has failed, and the connection setting information of the wireless setting-completed apparatus,
wherein the wireless communication apparatus acquires the first connection setting information and one or more pieces of second connection setting information that the wireless setting-completed apparatus stores as connection history, and includes an analysis unit that compares the first connection setting information with the second connection setting information,
wherein the analysis unit is provided in at least one of the wireless communication apparatus and the wireless setting-completed apparatus, and
wherein a comparison result obtained by the analysis unit comparing the first connection setting information with the second connection setting information is displayed on a display unit of the wireless setting-completed apparatus, or a display unit of the wireless communication apparatus.

12. A non-transitory computer-readable recording medium storing a program causing a computer of a wireless communication apparatus to:
perform a first wireless connection process for performing a wireless connection to a relay apparatus;
pre-store a temporary connection identifier for a temporary connection to a wireless setting-completed apparatus in which connection setting information for a connection to the relay apparatus is already set;
determine whether the wireless connection to the relay apparatus by the wireless connection process has failed;
perform a second wireless connection process different from the first wireless connection process,
the second wireless connection process including searching for the temporary connection identifier to search for the wireless setting-completed apparatus in a case where the wireless connection to the relay apparatus by the first wireless connection process has failed, performing the temporary connection to the wireless setting-completed apparatus which is found from the searching, acquiring connection setting information from the wireless setting-completed apparatus through the temporary connection, and performing a wireless connection to the relay apparatus based on the connection setting information,
the program further causing the computer of the wireless communication apparatus to:
transmit, through the temporary connection, a failure information of the first wireless connection process and a connection setting information that has been utilized by the first wireless connection process that has failed to the wireless setting-completed apparatus, and acquire, through the temporary connection, a connection setting information of the wireless setting-completed apparatus that has been transmitted based on a determination of the wireless setting-completed apparatus based on the failure information, the connection setting information that has been utilized by the first wireless connection process that has failed, and the connection setting information of the wireless setting-completed apparatus.

* * * * *